(12) United States Patent
Ishibashi et al.

(10) Patent No.: US 8,998,491 B2
(45) Date of Patent: Apr. 7, 2015

(54) LINEAR ACTUATOR

(75) Inventors: Koichiro Ishibashi, Tsukubamirai (JP); Seiji Takanashi, Noda (JP); Motohiro Sato, Toride (JP); Toshio Sato, Tsukuba (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/125,485

(22) PCT Filed: Jun. 19, 2012

(86) PCT No.: PCT/JP2012/065588
§ 371 (c)(1),
(2), (4) Date: Dec. 11, 2013

(87) PCT Pub. No.: WO2013/002064
PCT Pub. Date: Jan. 3, 2013

(65) Prior Publication Data
US 2014/0133787 A1  May 15, 2014

(30) Foreign Application Priority Data

Jun. 30, 2011 (JP) ................................ 2011-145472

(51) Int. Cl.
F16C 29/06 (2006.01)
F16C 33/10 (2006.01)
F16C 33/66 (2006.01)
F15B 15/14 (2006.01)
F15B 15/24 (2006.01)

(52) U.S. Cl.
CPC ......... *F16C 29/0607* (2013.01); *F16C 29/0609* (2013.01); *F15B 15/1404* (2013.01); *F15B 15/1471* (2013.01); *F15B 15/24* (2013.01); *F16C29/0623* (2013.01); *F16C 29/0678* (2013.01); *F16C 33/6681* (2013.01)

(58) Field of Classification Search
CPC ............. F16C 29/0607; F16C 29/0609; F16C 29/0678; F16C 29/0623; F16C 33/6681; F15B 15/14; F15B 15/1404; F15B 15/1414; F15B 15/1471; F15B 15/1476
USPC .................. 384/13, 15, 17, 43–45, 49, 51
See application file for complete search history.

(56) References Cited

U.S. PATENT DOCUMENTS 5,884,549 A * 3/1999 Hosono et al. ................... 92/5 R
6,014,924 A * 1/2000 Stoll et al. ....................... 92/13.5

(Continued)

FOREIGN PATENT DOCUMENTS

JP    3795968    7/2006

OTHER PUBLICATIONS

International Search Report Issued Jul. 24, 2012 in PCT/JP12/065588 Filed Jun. 19, 2012.

*Primary Examiner* — Marcus Charles
(74) *Attorney, Agent, or Firm* — Oblon, McClelland, Maier & Neustadt, L.L.P.

(57) ABSTRACT

A linear actuator includes a guide mechanism and a retainer. On a guide block of the guide mechanism, a pair of ball-circulating grooves is formed on the lower surface that faces a cylinder body. Multiple balls are loaded in the ball-circulating grooves. Paired cover blocks are respectively mounted on the two ends of the guide block. The retainer has the form of paired ball clips, which are formed as arms to engage with the cover blocks when the clips are inserted in the ball-circulating grooves to hold the balls. Paired cover plates are respectively mounted on the end faces of the cover blocks, and arm-shaped cover clips are mounted so as to hold the cover plates. The cover plates, the cover blocks, and the guide block are thereby integrally linked.

12 Claims, 20 Drawing Sheets

(56) References Cited

U.S. PATENT DOCUMENTS

| | | | |
|---|---|---|---|
| 7,150,564 B2* | 12/2006 | Lee | 384/45 |
| 7,191,695 B2* | 3/2007 | Sato et al. | 92/20 |
| 7,806,041 B2* | 10/2010 | Someya et al. | 92/146 |
| 2003/0005785 A1* | 1/2003 | Ung et al. | 74/89.4 |
| 2004/0093970 A1* | 5/2004 | Iida et al. | 74/89.33 |
| 2006/0056748 A1* | 3/2006 | Maffeis | 384/45 |

* cited by examiner

US 8,998,491 B2

LINEAR ACTUATOR

CROSS-REFERENCE TO RELATED APPLICATIONS

This application is a National Stage Application of International Application PCT/JP12/065588, filed Jun. 19, 2012, which claims the benefit of priority under 35 U.S.C. §119 from Japanese Patent Application No. 2011-145472, filed Jun. 30, 2011.

TECHNICAL FIELD

The present invention relates to a linear actuator in which a slide table is made to move reciprocally along an axial direction of a cylinder main body.

BACKGROUND ART

Heretofore, a linear actuator, for example, which is made up of a fluid pressure cylinder or the like, has been used as a means for transporting workpieces under the supply of a pressure fluid. As disclosed in Japanese Patent No. 3795968, the present applicants have proposed a linear actuator, which is capable of transporting a workpiece that is loaded onto a slide table by causing the slide table to move reciprocally in a straight line along a cylinder main body. However, with the aforementioned linear actuator, in recent years, there has been a demand to reduce manufacturing costs and to simplify the structure of the apparatus.

SUMMARY OF INVENTION

A general object of the present invention is to provide a linear actuator, which makes it possible to reduce production costs and to simplify the structure of the linear actuator.

The present invention is characterized by a linear actuator in which a slide table is made to move reciprocally along an axial direction of a cylinder main body, comprising:

a guide mechanism including a guide block attached to the cylinder main body and in which circulation grooves are formed through which a plurality of rolling bodies roll and circulate, and a cover member disposed on an end of the guide block, the guide mechanism guiding the slide table along an axial direction of the cylinder main body, and a retainer installed on the guide block, for retaining the rolling bodies freely circulatable in the circulation grooves, and for retaining the cover member with respect to the guide block, wherein the circulation grooves are formed to open in the guide block along a longitudinal direction thereof, and the retainer is disposed detachably with respect to the guide block.

According to the present invention, the guide mechanism that constitutes the linear actuator is equipped with the circulation grooves, which open along the longitudinal direction of the guide block, and the plural rolling bodies, which are circulated through the circulation grooves, are retained by the retainer. The retainer retains the plural rolling bodies so as to be freely circulatable in the circulation grooves of the guide block, and the rolling bodies are further retained by the cover member, which is disposed on the end of the guide block.

Accordingly, in comparison with a situation in which a cover member is attached with respect to the guide block by bolts or the like, the cover member can be simplified in structure, together with being more easily assembled through use of the retainer.

Further, on the guide block, instead of providing penetrating through holes in which the rolling bodies are circulated, since circulating grooves are formed that open along the axial direction, compared to a case of forming such through holes, the number of process steps and processing costs can be reduced. As a result, production costs for the linear actuator are reduced, and hence the linear actuator can be manufactured inexpensively.

DESCRIPTION OF EMBODIMENTS

Figure 1:
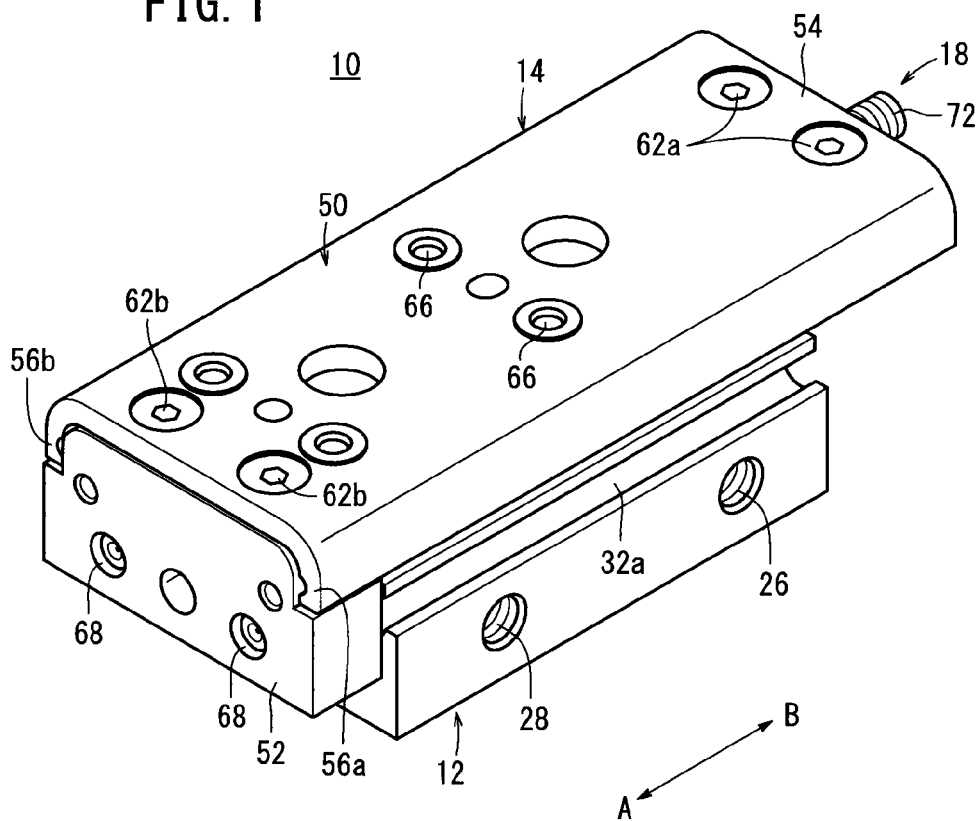
FIG. 1 is an exterior perspective view of a linear actuator according to a first embodiment of the present invention.
Figure 2:
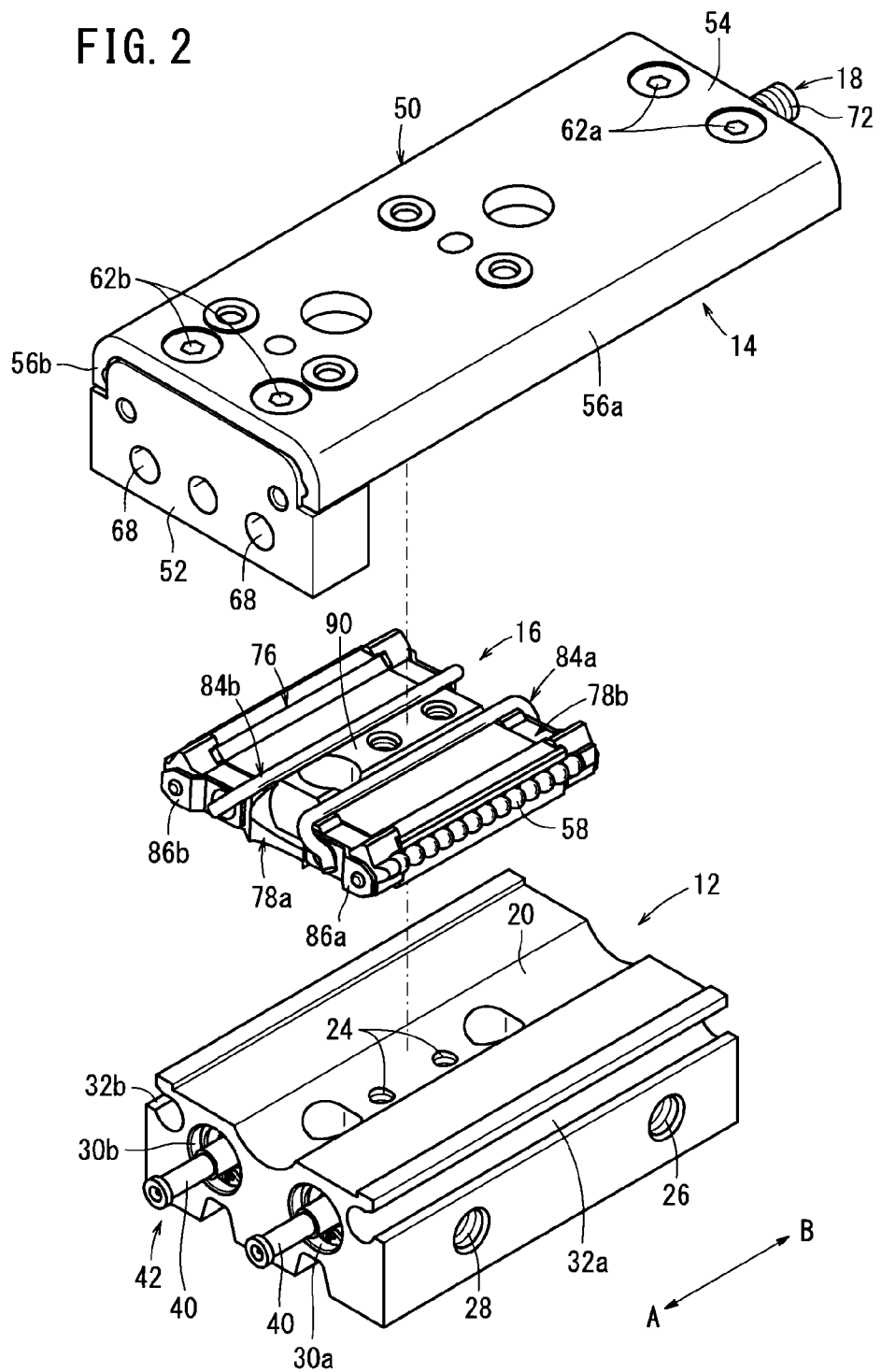
FIG. 2 is an exploded perspective view of the linear actuator shown in FIG. 1.
Figure 3:
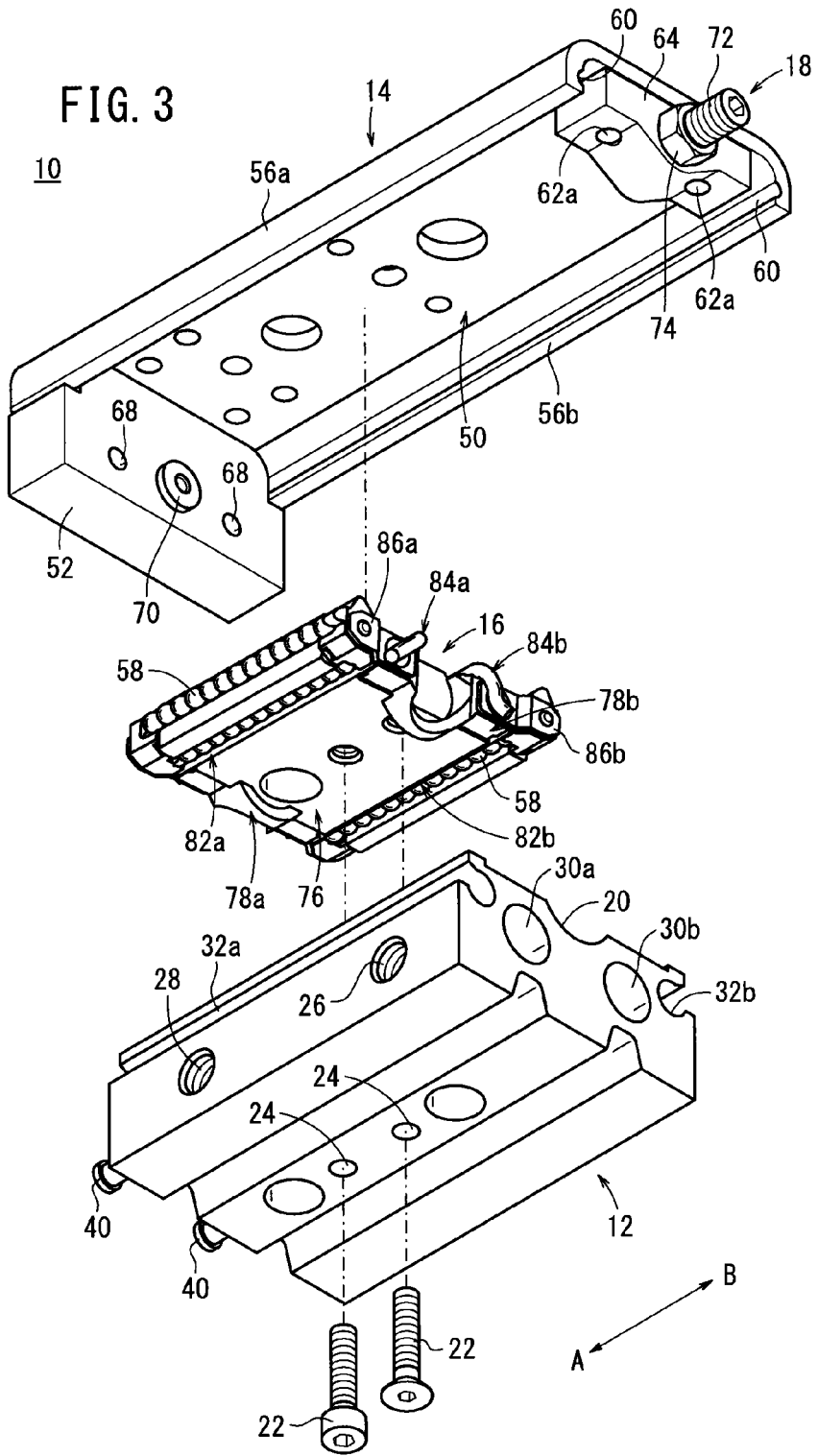
FIG. 3 is an exploded perspective view of the linear actuator of FIG. 2 as seen from a different direction.

As shown in FIGS. 1 through 7, a linear actuator 10 comprises a cylinder main body 12, a slide table 14 disposed on an upper portion of the cylinder main body 12 and which undergoes reciprocal motion in a straight line along a longitudinal direction (the directions of arrows A and B), a guide mechanism 16 disposed to intervene between the cylinder main body 12 and the slide table 14 for guiding the slide table 14 in the longitudinal direction (the directions of arrows A and B), and a stopper mechanism 18, which is capable of adjusting a displacement amount of the slide table 14.

The cylinder main body 12 has a rectangular cross section and has a predetermined length along the longitudinal direction (the directions of arrows A and B). A recess 20 having a sunken arcuate shape in cross section is formed roughly in the center on the upper surface of the cylinder main body 12 (see FIG. 2). The recess 20 extends along the longitudinal direction (the directions of arrows A and B), and in the recess 20, a pair of penetrating bolt holes 24 is provided, through which connecting bolts 22 are inserted for connecting the cylinder main body 12 with the guide mechanism 16.

Further, on one side surface of the cylinder main body 12, first and second ports 26, 28 for supply and discharge of a pressure fluid are formed perpendicularly to the longitudinal direction of the cylinder main body 12. The first and second ports 26, 28 communicate with a pair of penetrating holes 30a, 30b to be described later. Furthermore, on the opposite side surfaces of the cylinder main body 12, sensor attachment grooves 32a, 32b are formed, respectively, at positions along the longitudinal direction (the directions of arrows A and B), which have sensors (not shown) mounted therein.

On the bottom surface of the cylinder main body 12, the pair of bolt holes 24 is formed centrally in the widthwise direction on the axial line. The connecting bolts 22 are inserted through the bolt holes 24 from below. Additionally, the ends of the connecting bolts 22 project from the upper surface of the cylinder main body 12, and are connected mutually by threaded engagement with a guide block 76 of the guide mechanism 16.

On the other hand, inside the cylinder main body 12, a pair of penetrating holes 30a, 30b is formed, which penetrates along the longitudinal direction (the directions of arrows A and B), the one penetrating hole 30a and the other penetrating hole 30b being disposed substantially in parallel with each other and separated by a predetermined distance. Inside the penetrating holes 30a, 30b, cylinder mechanisms 42 are provided, respectively, each including a piston 38 on which a sealing ring 34 and a magnet 36 are installed on the outer circumference thereof, and a piston rod 40 connected to the piston 38. The cylinder mechanisms 42 are constituted by installation of the pair of pistons 38 and the piston rods 40, respectively, in the pair of penetrating holes 30a, 30b.

Figure 5:
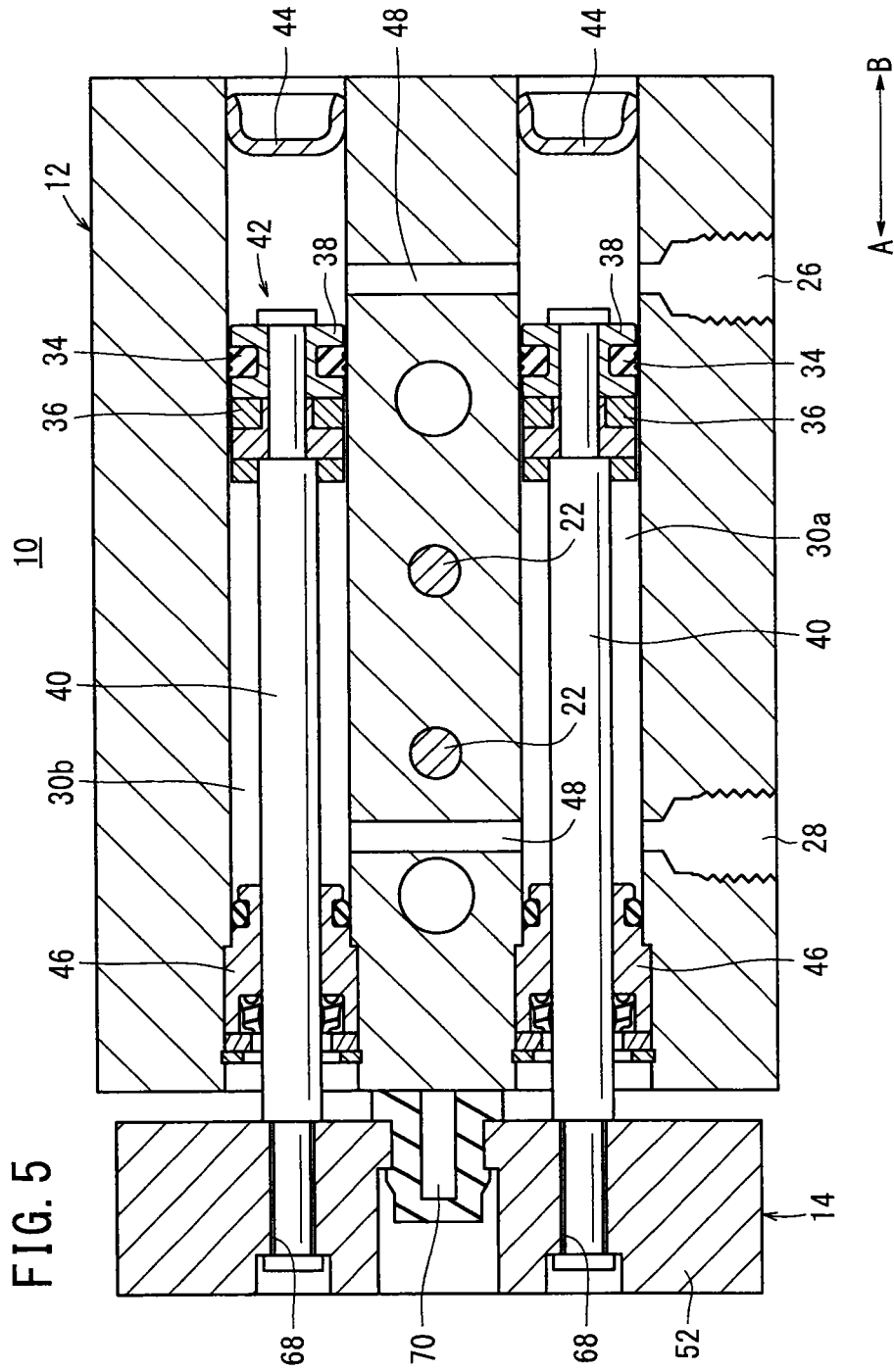
FIG. 5 is a cross sectional view taken along line V-V of FIG. 4.
Figure 6:
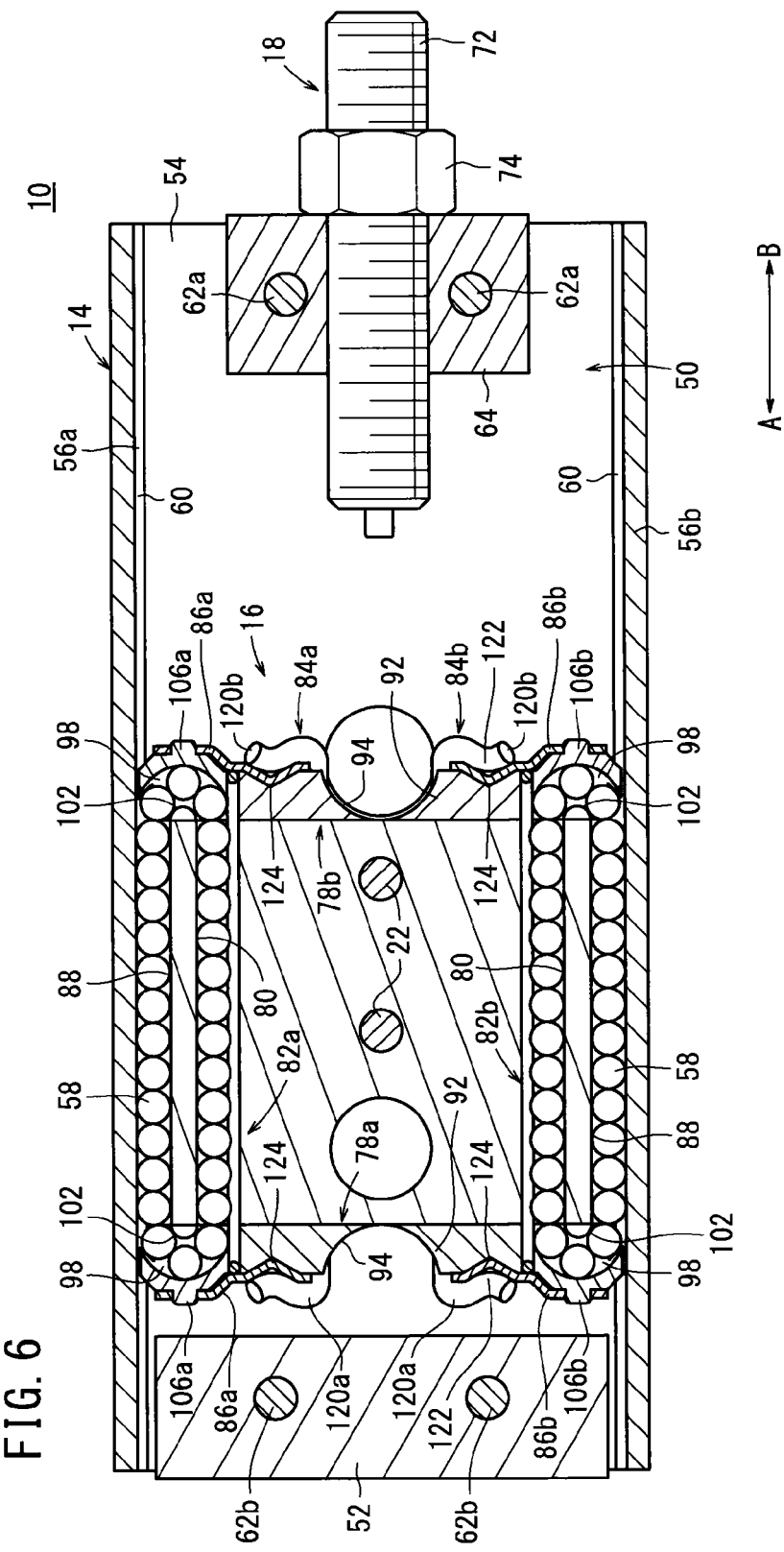
FIG. 6 is a cross sectional view taken along line VI-VI of FIG. 4.
Figure 7:
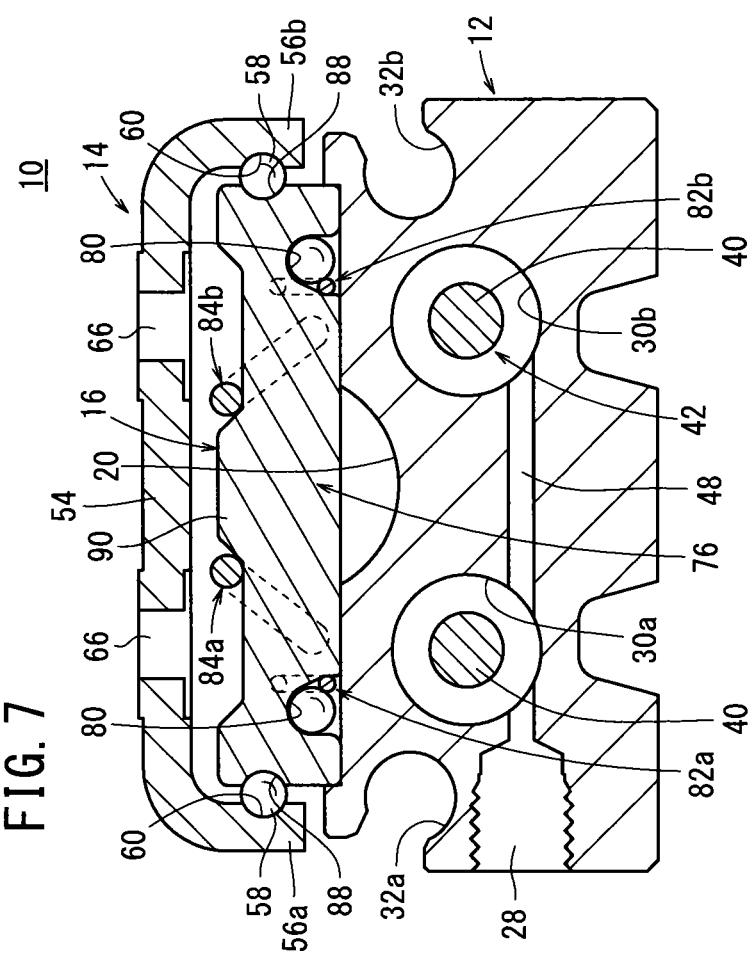
FIG. 7 is a cross sectional view taken along line VII-VII of FIG. 4.

As shown in FIG. 5, the penetrating holes 30a, 30b are closed and sealed at one end thereof by caps 44, whereas other ends of the penetrating holes 30a, 30b are sealed hermetically by rod holders 46, which are retained via locking rings.

Furthermore, one of the penetrating holes 30a communicates respectively with the first and second ports 26, 28, whereas the other penetrating hole 30b also communicates mutually with the one penetrating hole 30a via a pair of connecting passages 48 formed between the one penetrating hole 30a and the other penetrating hole 30b. More specifically, the pressure fluid is supplied to the first and second ports 26, 28 and introduced into the one penetrating hole 30a, and then the pressure fluid is introduced into the other penetrating hole 30b through the connecting passages 48. The connecting passages 48 are formed perpendicularly to the direction of extension (the directions of arrows A and B) of the penetrating holes 30a, 30b.

The slide table 14 comprises a table main body 50, and an end plate 52 connected to another end of the table main body 50. The end plate 52 is connected perpendicularly with respect to the table main body 50.

The table main body 50 is made up from a base member 54 that extends along the longitudinal direction (the directions of arrows A and B) with a predetermined thickness, and a pair of guide walls 56a, 56b that extend downward perpendicularly from both sides of the base member 54. On inner surfaces of the guide walls 56a, 56b, first ball guide grooves 60 are formed for guiding balls (rolling bodies) 58 of the guide mechanism 16, to be described later. The first ball guide grooves 60 are recessed with substantially semicircular shapes in cross section.

Further, on one end of the table main body 50, a holder portion 64 of the later-described stopper mechanism 18 is fixed by a pair of bolts 62a. Further, on another end of the table main body 50, an end plate is fixed thereto by another pair of bolts 62b.

Four workpiece retaining holes 66 are formed in the base member 54, which are separated mutually by predetermined distances. The workpiece retaining holes 66 are used for fixing a workpiece (not shown), for example, which is mounted on the slide table 14.

The end plate 52 is fixed to the other end of the table main body 50, and is disposed to face toward an end surface of the cylinder main body 12. The end plate 52 also is fixed to respective ends of the piston rods 40, which are inserted through a pair of rod holes 68 formed in the end plate 52. Owing thereto, the slide table 14 including the end plate 52 is displaceable together with the piston rods 40 along the longitudinal direction (the directions of arrows A and B) of the cylinder main body 12.

Further, a damper 70 is mounted through a damper installation hole substantially in the center of the end plate 52. The damper 70 is made from an elastic material such as rubber or the like, and is mounted such that an end portion thereof projects outwardly from the end surface of the end plate 52, so that upon displacement of the slide table 14, the damper 70 comes into abutment against an end surface of the cylinder main body 12.

The stopper mechanism 18 includes the holder portion 64 disposed on a lower surface of one end of the table main body 50, a stopper bolt 72 screw-engaged with respect to the holder portion 64, and a lock nut 74 for regulating advancing and retracting movements of the stopper bolt 72. The stopper mechanism 18 is disposed so as to face toward an end surface of the guide mechanism 16, which is disposed on the cylinder main body 12.

The holder portion 64 is formed in a block-like shape and is fixed by two bolts 62a with respect to the base member 54 of the table main body 50 of the slide table 14. In a center part of the holder portion 64, a screw hole is formed in which the stopper bolt 72 is screw-engaged.

The stopper bolt 72, for example, is made from a shank-shaped stud bolt engraved with threads on the outer peripheral surface thereof, and is screw-engaged in a screw hole of the holder portion 64. The lock nut 74 is screw-engaged with the stopper bolt 72 at a region projecting from an end surface of the holder portion 64.

Additionally, by threaded rotation of the stopper bolt 72 with respect to the holder portion 64, the stopper bolt 72 is displaced along the axial direction (the directions of arrows A and B), so as to approach and separate away from the guide mechanism 16, and by threaded rotation of the lock nut 74, advancing and retracting movements of the stopper bolt 72 are regulated.

Figure 8:
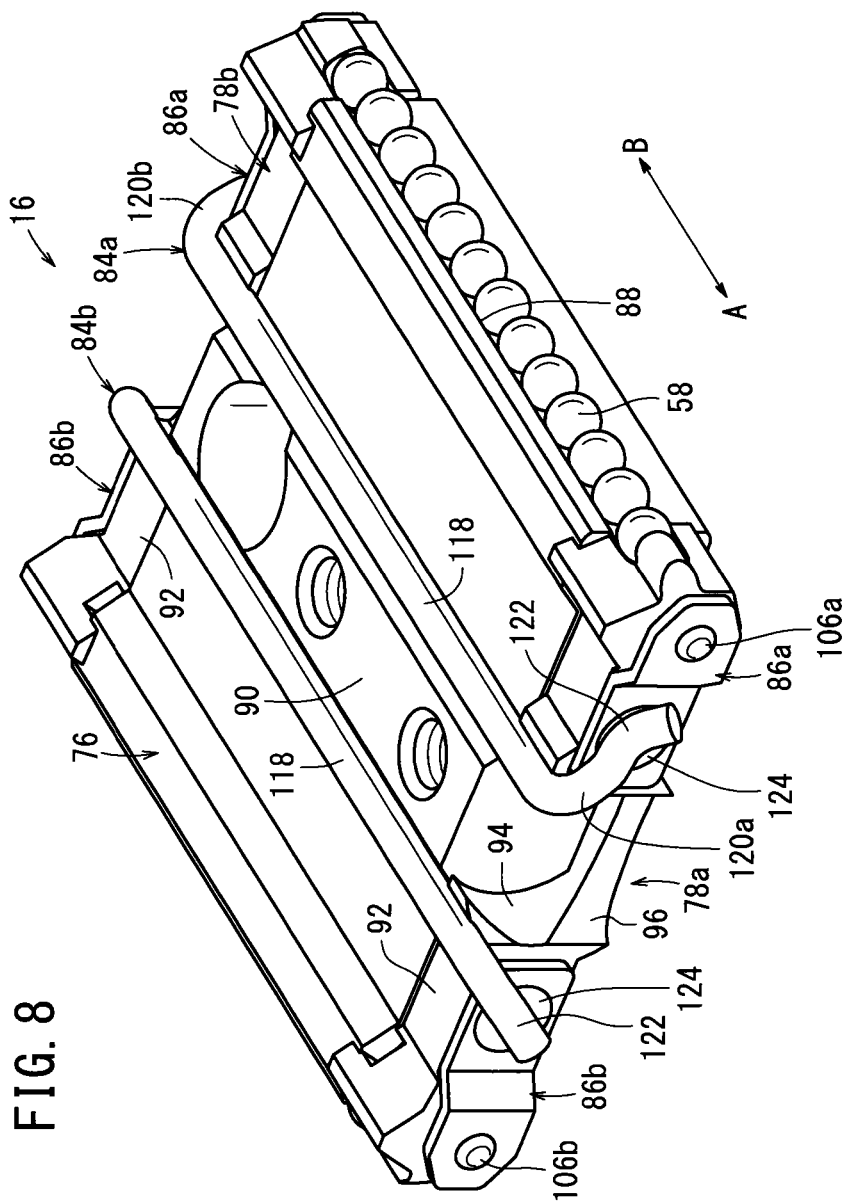
FIG. 8 is an exterior perspective view of a guide mechanism that constitutes part of the linear actuator of FIG. 1.
Figure 9:
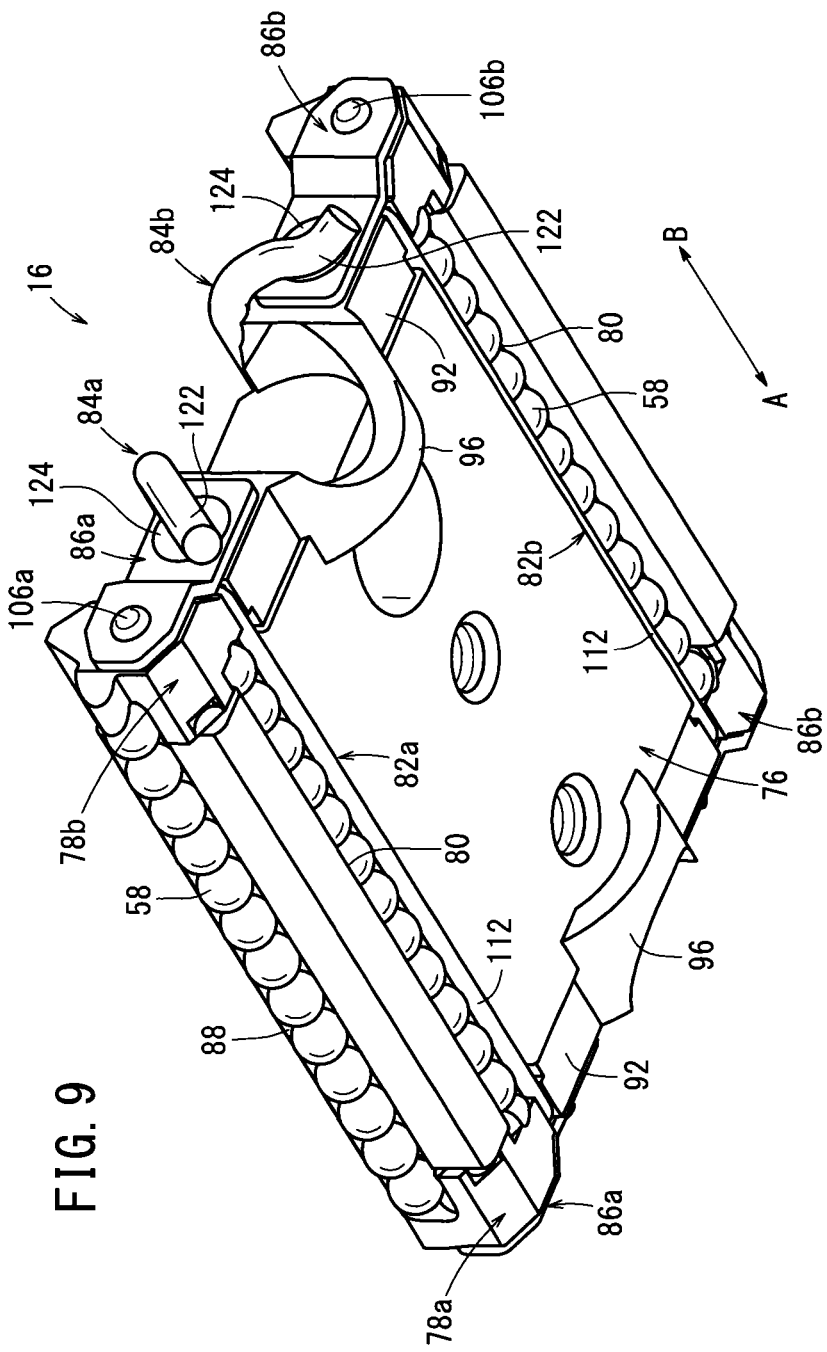
FIG. 9 is an exterior perspective view of the guide mechanism of FIG. 8 as seen from a different direction.
Figure 10:
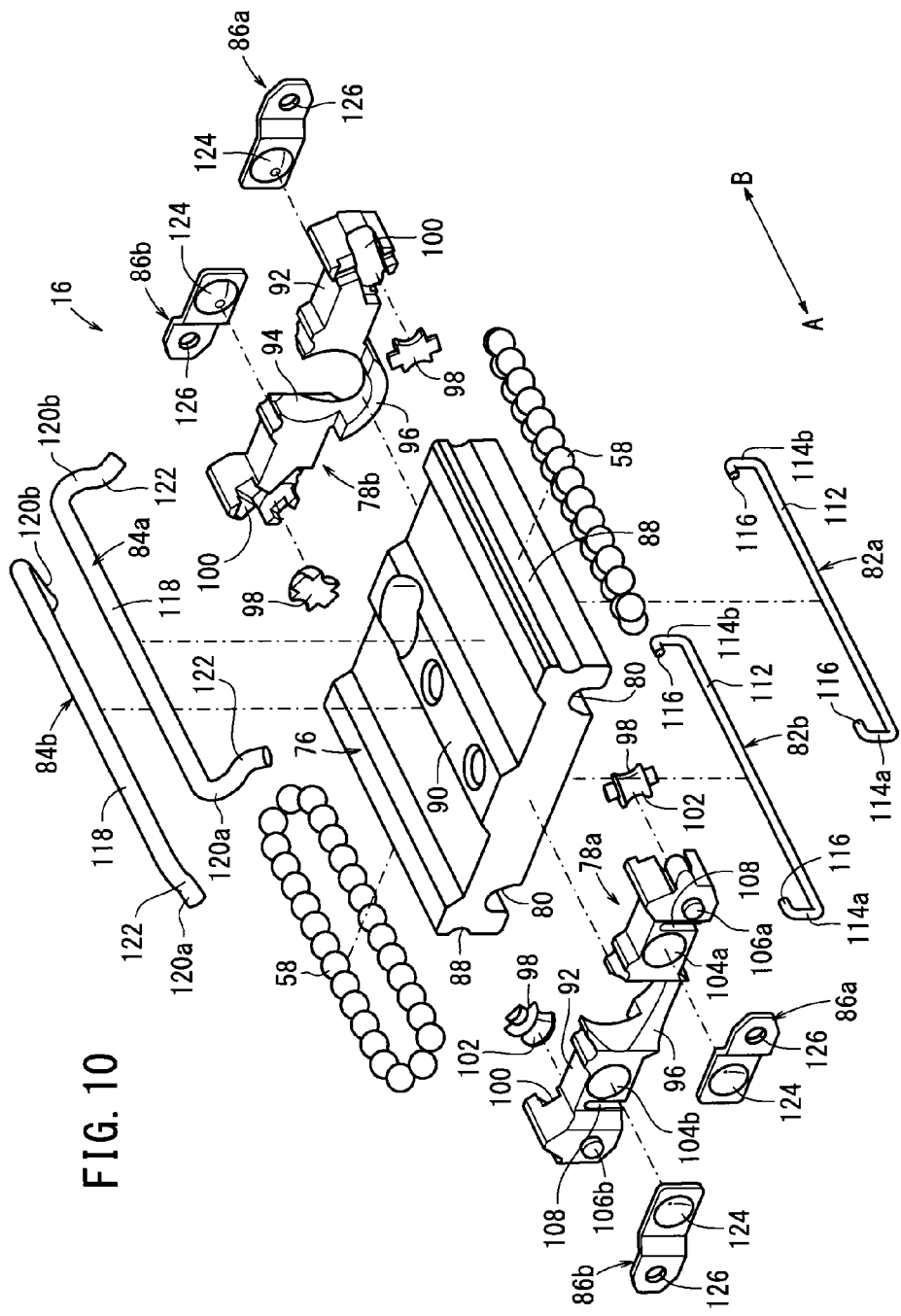
FIG. 10 is an exploded perspective view of the guide mechanism shown in FIG. 8.

As shown in FIGS. 8 through 10, the guide mechanism 16 includes the wide flat guide block 76, a pair of cover blocks (cover members) 78a, 78b disposed on opposite ends of the guide block 76, plural balls 58 that circulate in the longitudinal direction of the guide block 76, and a pair of ball clips (retaining members) 82a, 82b that retain the balls 58 in respective ball circulation grooves 80 of the guide block 76. Further, the guide mechanism 16 includes a pair of cover clips (other retaining members) 84a, 84b that serve to retain the cover blocks 78a, 78b with respect to the guide block 76, and two pairs of cover plates 86a, 86b which are mounted respectively on the cover blocks 78a, 78b.

The guide block 76, is formed, for example, from a metal material such as stainless or carbon steel, and is formed with second ball guide grooves 88 on opposite side surfaces thereof along the longitudinal direction (the directions of arrows A and B), and with the pair of ball circulation grooves 80, in which the balls 58 are installed, formed on a bottom surface thereof along the longitudinal direction (the directions of arrows A and B). More specifically, the second ball guide grooves 88 and the ball circulation grooves 80 are formed substantially in parallel with each other. Moreover, the second ball guide grooves 88 are formed with semicircular shapes in cross section in the same manner as the first ball guide grooves 60.

Additionally, when the slide table 14 is arranged on an upper part of the guide mechanism 16, the second ball guide grooves 88 are formed at positions confronting the first ball guide grooves 60, and the ball circulation grooves 80 are formed in facing relation to the upper surface of the cylinder main body 12.

Further, on the upper surface of the guide block 76, in a central part thereof, an upwardly bulging projection 90 is formed that extends in the longitudinal direction. The projection 90 is formed with a trapezoidal shape in cross section becoming slightly narrower in an upward direction.

The cover blocks 78a, 78b, for example, are made from a resin material such as nylon or the like, each of which includes a main body portion 92, and a cutout portion 94, which is cutout substantially centrally in the widthwise direction of the main body portion 92.

The main body portion 92 is formed in a divided manner in left and right widthwise directions about the cutout portion 94, with one end surface thereof that abuts against the guide block 76 being formed in a planar shape, and the other end surface thereof opposite from the one end surface being formed in a stepped shape.

Further, substantially in the center in the widthwise direction of the main body portion 92, an arcuate section 96 is formed, which projects downwardly with an arcuate shape in cross section. The arcuate section 96 is inserted into the recess 20 when the guide mechanism 16 is connected to the upper part of the cylinder main body 12.

Furthermore, when the main body portions 92 are placed in abutment against end surfaces of the guide block 76, the ends of the ball circulation grooves 80 are closed, and since the cutout portions 94 thereof penetrate from the one end surface to the other end surface of the cover blocks 78a, 78b, the end surfaces of the guide block 76 are exposed through the cutout portions 94. In addition, upon displacement of the slide table 14, displacement of the slide table 14 is regulated by abutment of the stopper bolt 72 of the stopper mechanism 18 against one end surface of the guide block 76.

Further, on one end surface of the main body portion 92, a pair of return guides 98, which serve to reverse the direction in which the balls 58 are circulated, is disposed respectively via installation holes 100. The return guides 98 are equipped with groove-shaped guide portions 102 formed with semicircular shapes in cross section, through which the balls 58 roll along an outer circumferential surface thereof. In addition, when the cover blocks 78a, 78b, in which the return guides 98 are installed, are mounted on opposite end surfaces of the guide block 76, one of the ends of the return guides 98 are connected to the ball circulation grooves 80, whereas other ends thereof are connected to the second ball guide grooves 88.

More specifically, the ball circulation grooves 80 and the second ball guide grooves 88 are connected by the return guides 98, such that, in the return guides 98, the balls 58 roll continuously while the direction of movement thereof is converted 180° from the ball circulation grooves 80 to the first and second ball guide grooves 60, 88 via the guide portions 102.

On the other hand, on the other side surface of the main body portion 92, a pair of retaining holes 104a, 104b, which are separated mutually by a predetermined distance, is formed about the cutout portion 94. Positioning pins 106a, 106b that project in the longitudinal direction are formed respectively on outer sides in the widthwise direction with respect to the retaining holes 104a, 104b. The retaining holes 104a, 104b are formed with a predetermined depth toward the one end surface side of the main body portion 92.

Further, on the other end surface of the main body portion, regions thereof having the positioning pins 106a, 106b are formed to project out in a direction away from the one end surface with respect to the region thereof in which the retaining holes 104a, 104b are formed.

More specifically, on the other end surface of the main body portion 92, outer sides thereof in the widthwise direction are formed with stepped portions, which project at a predetermined height in a direction away from the one end surface, with respect to a central vicinity alongside the cutout portion 94.

Furthermore, clip grooves 108, in which portions of the ball clips 82a, 82b are inserted, are formed on sides of the retaining holes 104a, 104b. The clip grooves 108 are formed with L-shapes in cross section, so as to connect with the lower surface from the other end surface of the main body portion 92, and end portions of the clip grooves 108 communicate with the ball circulation grooves 80, whereas on other end portions thereof, clip holes (not shown) are formed, which are recessed toward the one end surface side of the main body portion 92. The clip grooves 108 are formed with a width dimension that corresponds to the thickness of the ball clips 82a, 82b, to be described below.

The ball clips 82a, 82b, for example, are formed from a metal material such as stainless steel or the like, each of which comprises a first straight portion 112 formed in a straight line, and a pair of first bent portions 114a, 114b formed on opposite ends of the first straight portion 112. The first bent portions 114a, 114b are formed perpendicularly with respect to the first straight portion 112. One of the first bent portions 114a and the other of the first bent portions 114b are bent in the same direction with respect to the first straight portion 112, and are formed substantially in parallel mutually with one another.

Further, on ends of the first bent portions 114a, 114b, engagement parts 116 are formed, respectively, which are folded again perpendicularly from the ends and extend in directions to approach one another mutually. The engagement parts 116 are formed substantially in parallel with the first straight portion 112, and with a predetermined length with respect to the first bent portions 114a, 114b.

Furthermore, on the ball clips 82a, 82b, the distance in the longitudinal direction (the directions of arrows A and B) between one of the first bent portions 114a and the other of the first bent portions 114b is substantially the same or slightly smaller than the length in the longitudinal direction (the directions of arrows A and B) of the pair of cover blocks 78a, 78b and the guide block 76.

In addition, the first straight portions 112 of the ball clips 82a, 82b are installed on the lower surface side of the guide block 76, and are inserted inside the ball circulation grooves

80. In greater detail, the first straight portions 112 are arranged in the ball circulation grooves 80 on a central side of the guide block 76, and at locations proximate to the lower surface of the guide block 76 (see FIG. 7).

More specifically, the first straight portions 112 retain the balls 58 by abutment against outer circumferential surfaces of the balls 58 in the ball circulation grooves 80, and the balls 58 are retained in the ball circulation grooves 80 in a condition that prevents falling out of the balls 58 in a direction away from the ball circulation grooves 80.

Stated otherwise, the first straight portions 112 serve to guide the plural balls 58 in the ball circulation grooves 80 so as to be freely circulatable along the longitudinal direction (the directions of arrows A and B) of the guide block 76.

Further, in a condition in which the pair of cover blocks 78a, 78b is disposed on both end surfaces of the guide block 76, opposite ends of the first straight portions 112 and the first bent portions 114a, 114b of the ball clips 82a, 82b are inserted into the clip grooves 108 of the cover blocks 78a, 78b, together with the engagement parts 116 being inserted respectively into the clip holes. Consequently, simultaneously with the ball clips 82a, 82b being retained with respect to the guide block 76 and the cover blocks 78a, 78b, the guide block 76 is sandwiched between the pair of cover blocks 78a, 78b while being biased by the ball clips 82a, 82b in a direction to be pulled mutually toward each other, so that the cover blocks 78a, 78b are retained in a state of abutment against the guide block 76.

Stated otherwise, the ball clips 82a, 82b are doubly equipped with a function to retain the plural balls 58 with respect to the guide block 76, and with a function to retain the pair of cover blocks 78a, 78b with respect to both ends of the guide block 76.

The cover clips 84a, 84b, for example, are formed from a metal material such as stainless steel or the like, each of which comprises a second straight portion 118 formed in a straight line, and a pair of second bent portions 120a, 120b formed on both ends of the second straight portion 118. The cover clips 84a, 84b, for example, are formed by wires having a thickness greater than that of the ball clips 82a, 82b.

The second bent portions 120a, 120b are formed substantially perpendicular to the second straight portion 118, and include bulging portions 122 that bulge outwardly in the direction of extension (the directions of arrows A and B) of the second straight portion 118 in the vicinity of the ends thereof. One of the second bent portions 120a and the other of the second bent portions 120b are bent in the same direction with respect to the second straight portion 118, and are formed substantially in parallel mutually with one another.

The bulging portions 122, for example, are arc-shaped in cross section, bulging outwardly such that the bulging portion 122 on one of the second bent portions 120a and the bulging portion 122 on the other of the second bent portions 120b approach one another mutually.

Furthermore, on the cover clips 84a, 84b, the distance in the longitudinal direction (the directions of arrows A and B) between one of the second bent portions 120a and the other of the second bent portions 120b is substantially the same or slightly smaller than the length in the longitudinal direction of the pair of cover blocks 78a, 78b and the guide block 76.

The cover plates 86a, 86b, for example, are formed by press forming a plate-like member made from a metal material. The cover plates 86a, 86b are installed, as one pair each, respectively, on the other side surfaces of the main body portions 92 on one and the other of the cover blocks 78a, 78b.

The cover plates 86a, 86b are formed in stepped shapes corresponding to the other side surfaces of the cover blocks 78a, 78b, and comprise insertion parts 124 formed on one portion thereof, which are inserted into the retaining holes 104a, 104b, and pin holes 126 formed on another portion thereof, on outer sides in the widthwise direction of the cover plates 86a, 86b with respect to the insertion parts 124.

The insertion parts 124 project outwardly in semispherical shapes on one side surface in the thickness direction of the cover plates 86a, 86b, and are recessed inwardly on the other side surface thereof.

In addition, when the cover plates 86a, 86b are mounted on the cover blocks 78a, 78b, the cover plates 86a, 86b are placed in abutment against the other end surfaces of the cover blocks 78a, 78b, and the positioning pins 106a, 106b are inserted in the pin holes 126, together with the insertion parts 124 being inserted into the retaining holes 104a, 104b. Consequently, the pairs of cover plates 86a, 86b are mounted in a properly positioned condition with respect to the other end surfaces of the cover blocks 78a, 78b.

Further, in a state in which the pair of cover blocks 78a, 78b have been mounted on both end surfaces of the guide block 76, installation of the cover clips 84a, 84b is carried out from the upper side of the guide block 76. At this time, the second straight portions 118 of the cover clips 84a, 84b are placed in abutment against the upper surface of the guide block 76 in contact with the projection 90. In addition, the bulging portions 122 are inserted respectively into the recesses formed on the other side surfaces of the insertion parts 124.

Consequently, in a state in which the cover plates 86a, 86b are in abutment against the cover blocks 78a, 78b, and the cover blocks 78a, 78b are in abutment against end surfaces of the guide block 76, the cover plates 86a, 86b, the cover blocks 78a, 78b, and the guide block 76 are retained by the pair of cover clips 84a, 84b, so as not to be displaceable relatively in the longitudinal direction (the directions of arrows A and B). Stated otherwise, the cover clips 84a, 84b, the cover plates 86a, 86b, the cover blocks 78a, 78b, and the guide block 76 are maintained in a connected condition in the longitudinal direction (the directions of arrows A and B) of the guide block 76.

At this time, the second straight portions 118 of the cover clips 84a, 84b are arranged in an exposed manner on an upper portion of the guide block 76, whereas the first straight portions 112 of the ball clips 82a, 82b are arranged in an exposed manner on a lower portion of the guide block 76.

The linear actuator 10 according to the first embodiment of the present invention basically is constructed as described above. Next, an explanation shall be given concerning assembly of the guide mechanism 16 of the linear actuator 10.

At first, from the state shown in FIG. 10, after the plural balls 58 have been installed in the second ball guide grooves 88 and the ball circulation grooves 80 of the guide block 76, the cover blocks 78a, 78b are placed in abutment against both end surfaces of the guide block 76. In this case, the balls 58 installed in the second ball guide grooves 88 are retained to prevent their falling out from the guide block 76 by a non-illustrated jig or the like.

Next, the pair of ball clips 82a, 82b is brought into proximity with respect to the guide block 76, and after the first straight portions 112 thereof have been inserted inside the pair of ball circulation grooves 80, the first bent portions 114a, 114b are inserted into the clip grooves 108, together with the engagement parts 116 thereof being inserted respectively in the clip holes. As a result, the plural balls 58 in the ball circulation grooves 80 are retained by the first straight portions 112 of the ball clips 82a, 82b, so that the balls 58 cannot fall out from the open ball circulation grooves 80.

Further, concerning the pair of cover blocks 78a, 78b, due to the engagement parts 116 of the pair of ball clips 82a, 82b being engaged with the clip holes, and the first bent portions 114a, 114b being inserted into the clip grooves 108, the cover blocks 78a, 78b are pressed respectively toward the sides of the guide block 76. Owing thereto, the cover blocks 78a, 78b are retained against both end surfaces of the guide block 76 by the ball clips 82a, 82b. Stated otherwise, the ball clips 82a, 82b pull on one of the cover blocks 78a and the other of the cover blocks 78b in directions to approach one another mutually.

Lastly, the cover plates 86a, 86b are mounted respectively on the pair of cover blocks 78a, 78b. In this case, first, the insertion parts 124 of the cover plates 86a, 86b are inserted into the retaining holes 104a, 104b of the cover blocks 78a, 78b, and the positioning pins 106a, 106b are inserted into the pin holes 126, whereby the respective pairs of cover plates 86a, 86b are positioned with respect to the cover blocks 78a, 78b. In addition, the pair of cover clips 84a, 84b is arranged in proximity to the guide block 76 and the cover blocks 78a, 78b from a side opposite from the ball clips 82a, 82b, the second straight portions 118 are placed in abutment against the vicinity of the projection 90, and the bulging portions 122 are inserted into the insertion parts 124 of the cover plates 86a, 86b.

Consequently, by operation of both end parts of the pair of cover clips 84a, 84b, a state is maintained in which the cover plates 86a, 86b are mounted respectively on the cover blocks 78a, 78b, and both end parts of the ball clips 82a, 82b, which are inserted in the clip grooves 108 and the clip holes, are covered and held by the cover plates 86a, 86b. Also, the cover plates 86a, 86b, the cover blocks 78a, 78b, and the guide block 76 are integrally fixed.

As a result, in a state in which the cover plates 86a, 86b abut against the cover blocks 78a, 78b, and the cover blocks 78a, 78b abut against end surfaces of the guide block 76, the cover plates 86a, 86b, the cover blocks 78a, 78b, and the guide block 76 are retained together in an integrally connected fashion by the pair of cover clips 84a, 84b, such that relative displacement thereof in the longitudinal direction (the directions of arrows A and B) cannot occur.

In addition, the guide mechanism 16, which is assembled as described above, is fixed to an upper part of the cylinder main body 12 through the connecting bolts 22.

In the foregoing manner, with the first embodiment, in the guide mechanism 16 that constitutes the linear actuator 10, by using the pair of ball clips 82a, 82b, the plural balls 58 can be retained in a freely circulatable condition with respect to the guide block 76, and the pair of cover blocks 78a, 78b, which are in abutment against both ends of the guide block 76, can be fixed easily by the pair of cover clips 84a, 84b. As a result, for example, compared to a case of being assembled mutually using bolts or the like, the guide mechanism 16 including the guide block 76 and the cover blocks 78a, 78b, etc., can be assembled more easily, and the structure thereof can be simplified. Therefore, in a linear actuator 10 that includes the guide mechanism 16, the number of manufacturing steps can be reduced.

Further, in the guide block 76, instead of providing penetrating holes through which the balls 58 circulate, a structure is provided in which ball circulation grooves 80, which open downwardly, are formed, and the balls 58 are made to circulate through the ball circulation grooves 80. Owing thereto, compared to the case of forming penetrating holes therein, the number of process steps as well as processing costs can be reduced. As a result, manufacturing costs for the linear actuator 10 can be reduced.

Furthermore, since the ball clips 82a, 82b are elastic, in a state in which the guide block 76 and the cover blocks 78a, 78b are installed, the ball clips 82a, 82b are capable of being deformed in a follow-on manner with respect to the outer circumferential surfaces of the plural balls 58, and the balls 58 can be retained reliably in a condition that enables circulation thereof.

Further, by installation of the ball clips 82a, 82b in the clip grooves 108 formed on the cover blocks 78a, 78b, positioning of the ball clips 82a, 82b can be carried out easily and reliably. Therefore, it is possible for the ball clips 82a, 82b to always be retained at the same position with respect to the plural balls 58, and the balls 58 can be retained in a stable manner.

Furthermore, the bulging portions 122 of the cover clips 84a, 84b are inserted and placed in engagement with the insertion parts 124 of the cover plates 86a, 86b, whereby falling out of the cover clips 84a, 84b with respect to the cover plates 86a, 86b is prevented. As a result, the cover plates 86a, 86b, the cover blocks 78a, 78b, and the guide block 76 can be kept in a connected state stably and reliably by the cover clips 84a, 84b.

Further still, at the same time that the pair of cover blocks 78a, 78b is retained by the pair of ball clips 82a, 82b with respect to the guide block 76, the cover blocks 78a, 78b are retained by the pair of cover clips 84a, 84b, which are formed with a wire thickness greater than that of the ball clips 82a, 82b. Therefore, the cover blocks 78a, 78b can be fixed reliably and firmly with respect to both end surfaces of the guide block 76.

Still further, in the guide block 76, since the ball circulation grooves 80 in which the balls 58 are installed are disposed so as to open on the lower surface side facing the cylinder main body 12, the balls 58 are retained by the ball clips 82a, 82b, and the ball clips 82a, 82b are retained by abutment thereof on the upper surface of the cylinder main body 12. For this reason, even though the ball clips 82a, 82b may not have high structural integrity, the balls 58 can be retained reliably thereby in cooperation with the upper surface of the cylinder main body 12.

Figure 4:
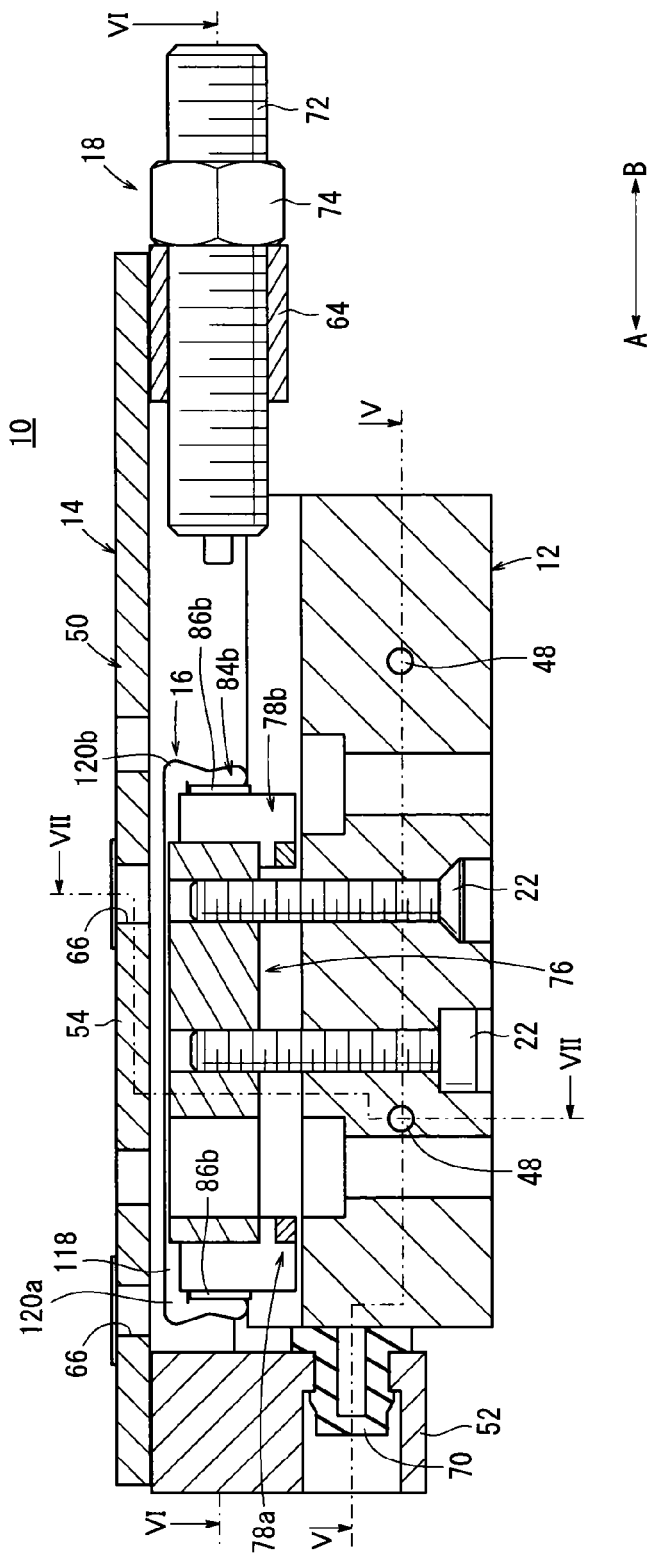
FIG. 4 is an overall vertical cross sectional view of the linear actuator of FIG. 1.

Next, operations and effects of the linear actuator 10, which includes the guide mechanism 16 assembled in the foregoing manner, will be explained. A condition in which the end plate 52 of the slide table 14 abuts against the end surface of the cylinder main body 12, as shown in FIGS. 4 and 5, will be referred to as an initial position.

First, a pressure fluid from a non-illustrated pressure fluid supply source is introduced to the first port 26. In this case, the second port 28 is placed in a condition of being open to atmosphere under the operation of a non-illustrated switching valve.

Pressure fluid supplied to the first port 26 is supplied to one of the penetrating holes 30a and also is supplied to the other of the penetrating holes 30b through the connecting passages 48, whereby the pistons 38 are pressed (in the direction of the arrow A) toward the rod holders 46. Consequently, the slide table 14 is displaced together with the piston rods 40, which are connected to the pistons 38, in a direction to separate away from the cylinder main body 12.

At this time, the balls 58 of the guide mechanism 16 roll along the ball circulation passage accompanying displacement of the slide table 14, whereby the slide table 14 is guided in the axial direction by the guide mechanism 16.

Then, the end of the stopper bolt 72, which is provided at one end of the slide table 14, abuts against the end surface of the guide block 76 of the guide mechanism 16, and displacement of the slide table 14 is stopped, whereupon the slide table 14 reaches a displacement end position.

After loosening the lock nut 74 to enable advancing/retracting movement of the stopper bolt 72, the amount at which the stopper bolt 72 projects from the end surface of the holder portion 64 may be adjusted by threaded-rotation of the stopper bolt 72, whereby the displacement amount of the slide table 14 can also be adjusted.

On the other hand, in the case that the slide table 14 is displaced in a direction opposite to the above direction, i.e., in a direction away from the displacement end position, the pressure fluid, which was supplied to the first port 26, is supplied with respect to the second port 28, whereas the first port 26 is placed in a state of being open to atmosphere. As a result, by means of the pressure fluid, which is supplied into the pair of penetrating holes 30a, 30b from the second port 28, the pistons 38 are displaced in a direction to separate away from the rod holders 46 (in the direction of the arrow B), and the slide table 14 is displaced through the pistons 38 together with the piston rods 40 in a direction to approach the cylinder main body 12. In addition, by abutment of the damper 70, which is disposed on the end plate 52 of the slide table 14, against the end surface of the cylinder main body 12, the initial position is restored.

With the above-described guide mechanism 16, although a structure is provided that is equipped, respectively, with the ball clips 82a, 82b for retaining the plural balls 58 and the pair of cover blocks 78a, 78b, and the cover clips 84a, 84b for retaining the cover blocks 78a, 78b and the cover plates 86a, 86b, the guide mechanism 16 is not limited to such a structure. For example, the guide mechanism 16 may be of a structure in which the balls 58 are retained together with the cover blocks 78a, 78b only by the ball clips 82a, 82b, and which does not include the cover plates 86a, 86b and the cover clips 84a, 84b. In this case, the number of parts of the guide mechanism 16 and the number of assembly steps can be reduced.

Figure 11:
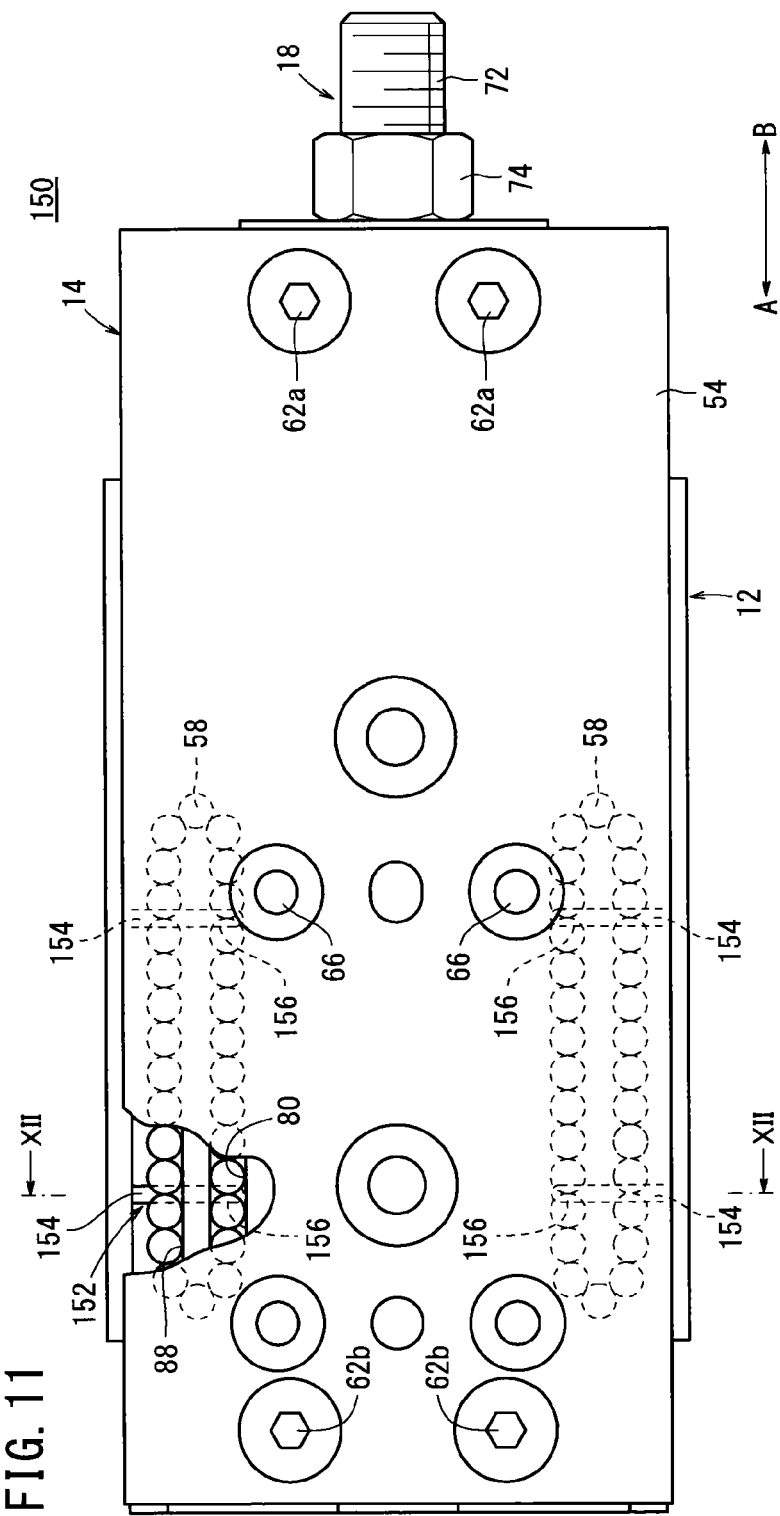
FIG. 11 is an exterior perspective view of a linear actuator according to a second embodiment of the present invention.
Figure 12:
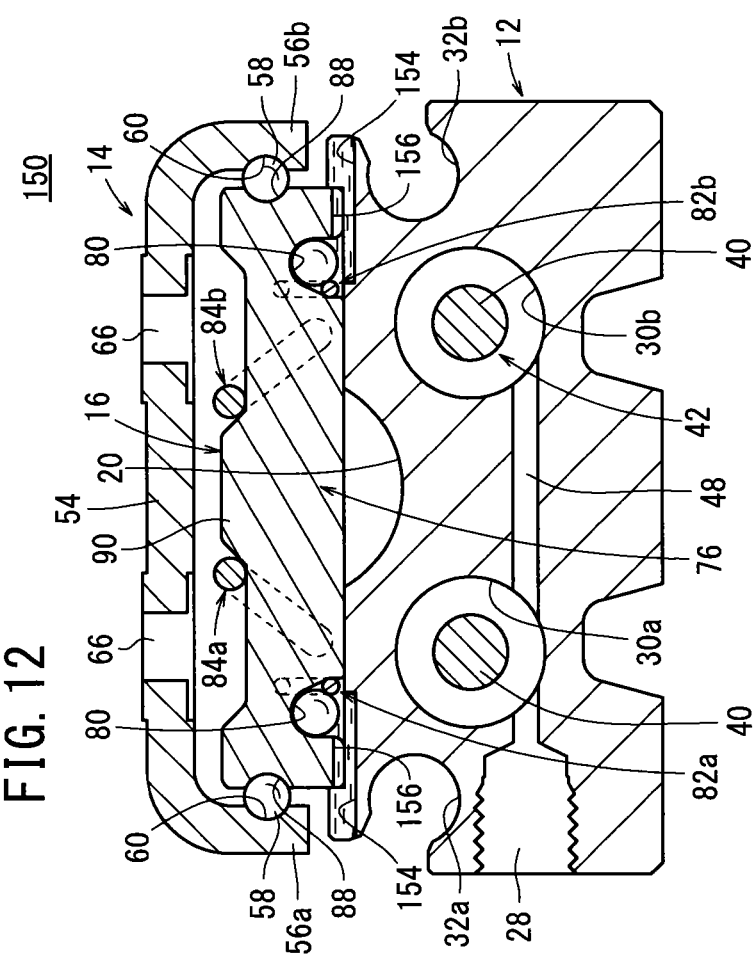
FIG. 12 is a cross sectional view taken along line XII-XII of FIG. 11.
Figure 13:
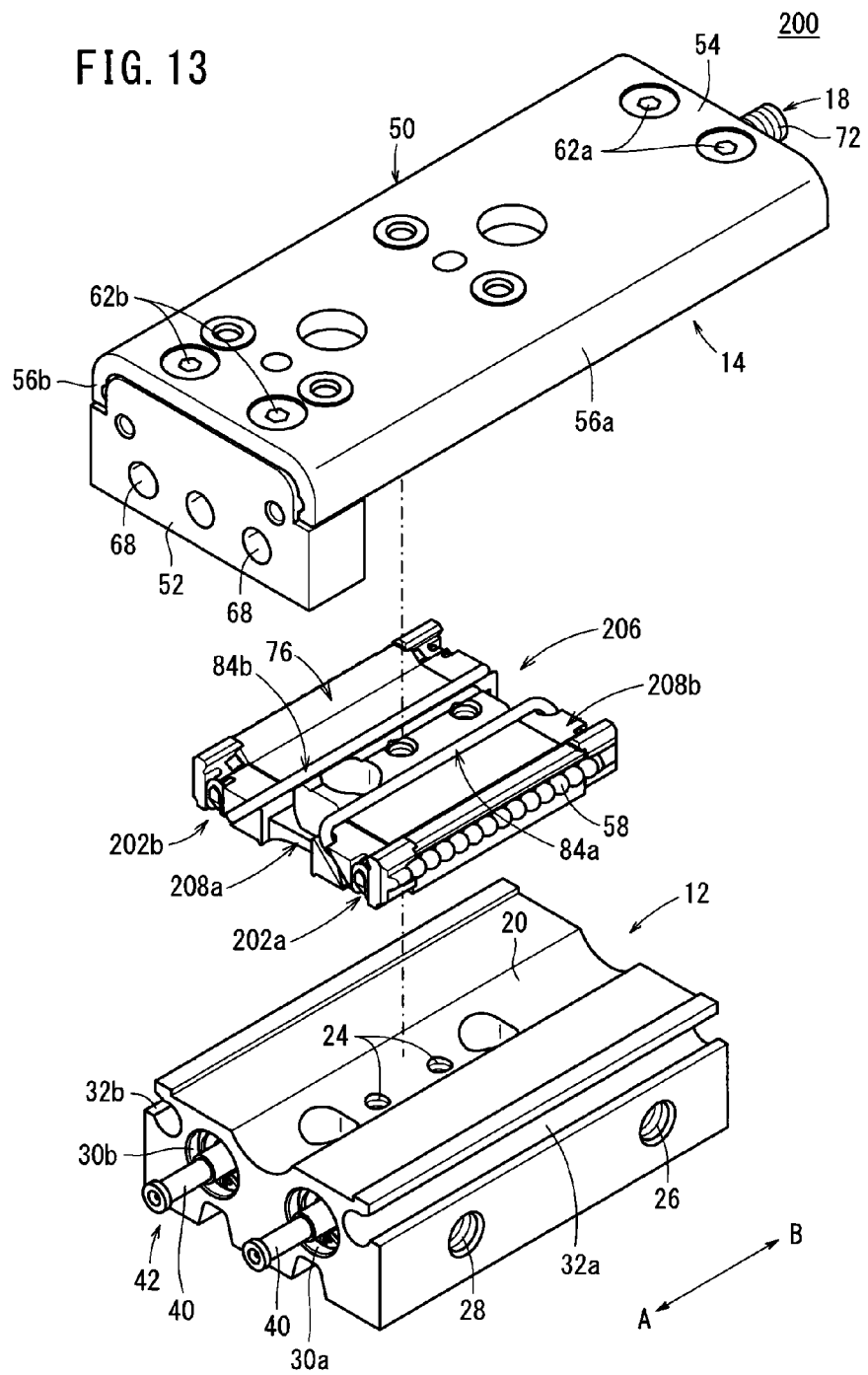
FIG. 13 is an exploded perspective view of a linear actuator according to a third embodiment of the present invention.
Figure 14:
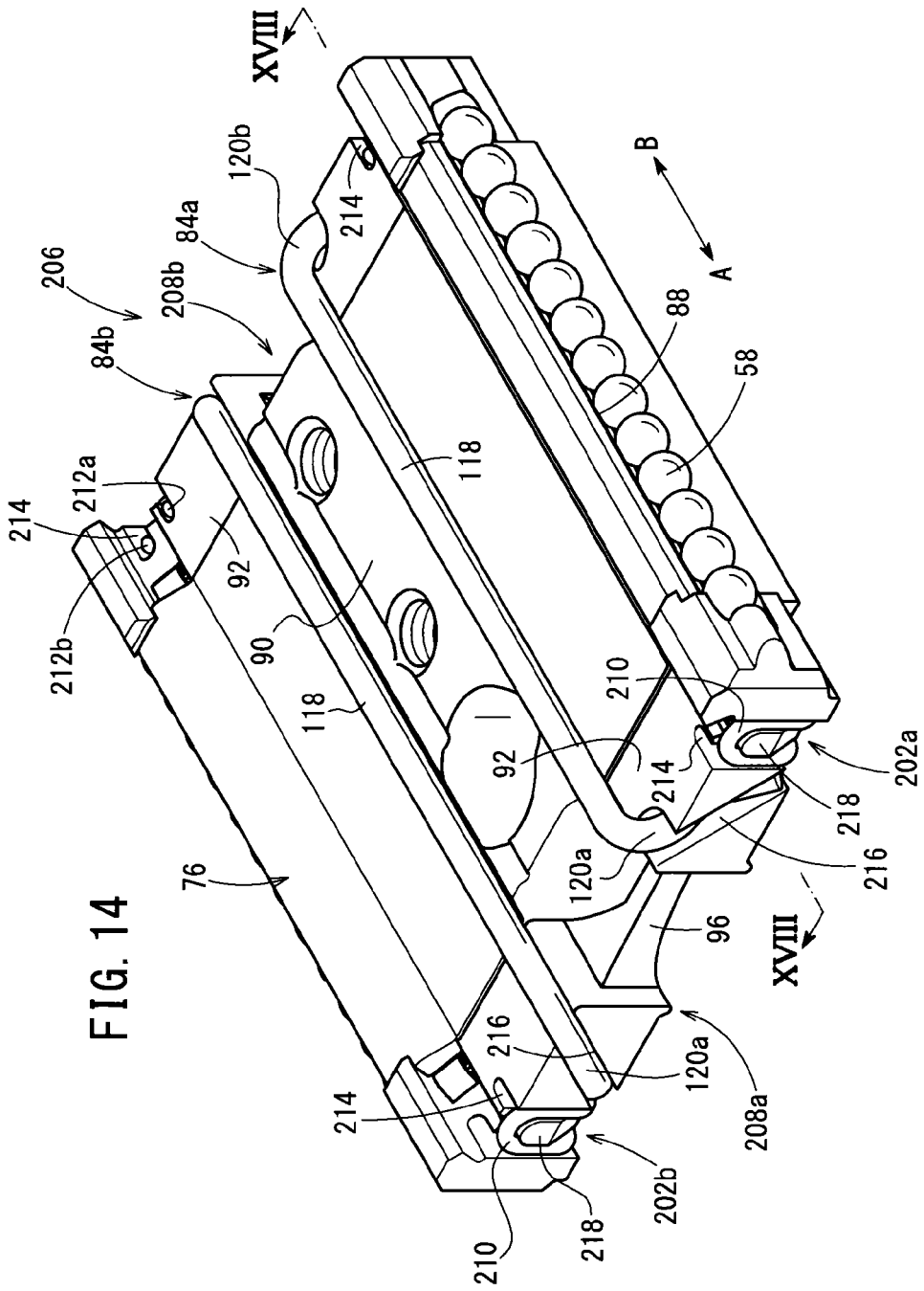
FIG. 14 is an exterior perspective view of a guide mechanism that constitutes part of the linear actuator of FIG. 13.
Figure 15:
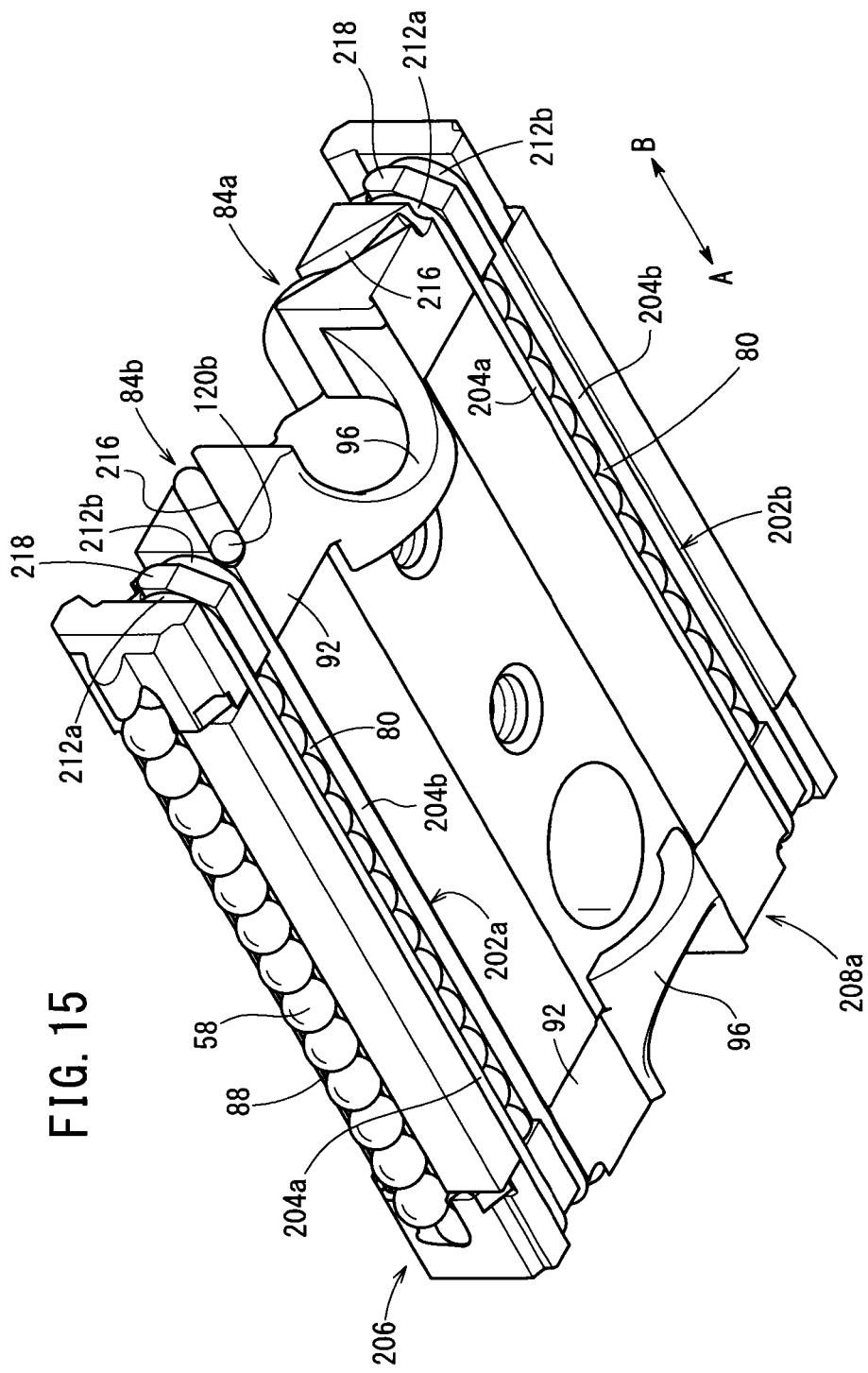
FIG. 15 is an exterior perspective view of the guide mechanism of FIG. 14 as seen from a different direction.
Figure 16:
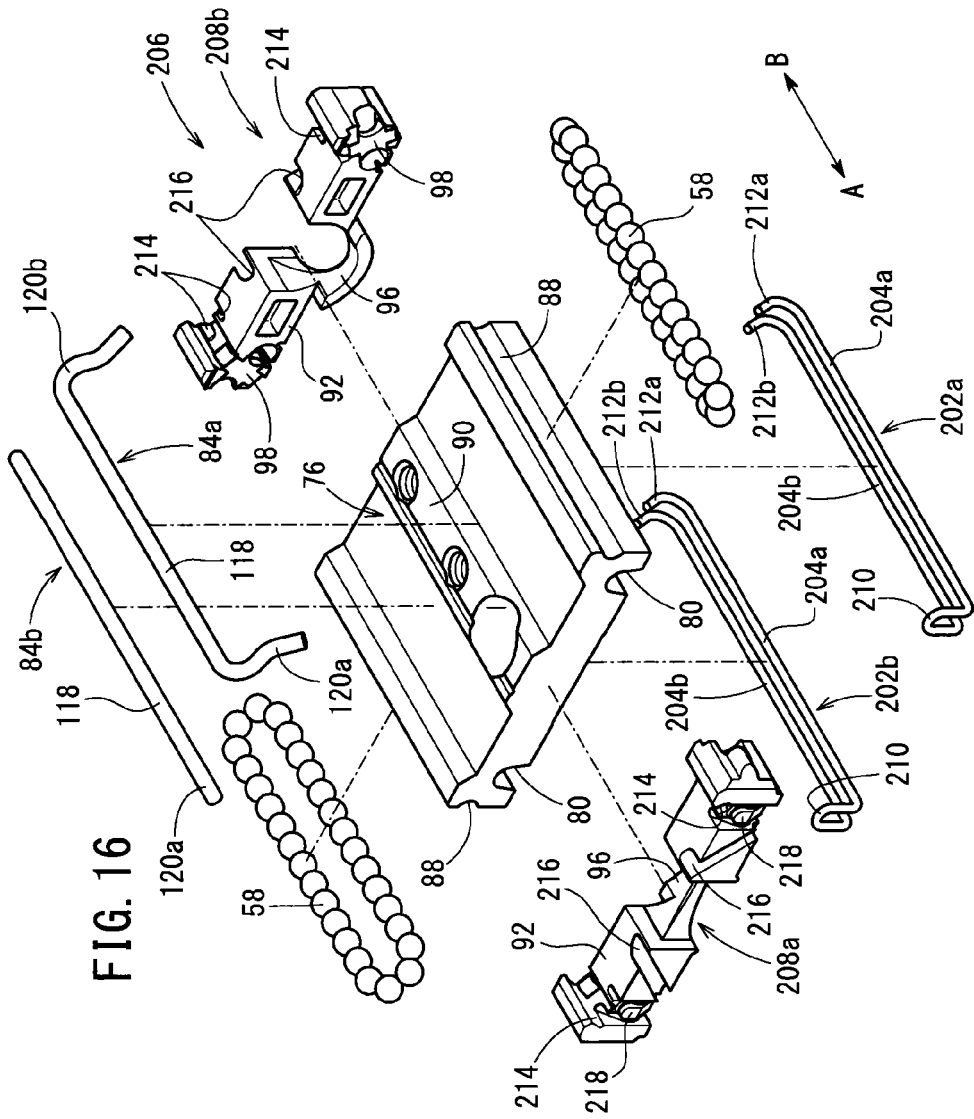
FIG. 16 is an exploded perspective view of the guide mechanism shown in FIG. 14.

Next, a linear actuator 150 according to a second embodiment is shown in FIGS. 11 and 12. Constituent elements thereof, which are the same as those found in the linear actuator 10 according to the aforementioned first embodiment, are denoted by the same reference characters, and detailed description of such features is omitted.

As shown in FIGS. 11 and 12, the linear actuator 150 according to the second embodiment differs from the linear actuator 10 according to the first embodiment, in that, in the cylinder main body 12 and the guide mechanism 16, lubricating oil supply portions 152 are provided, which are capable of supplying lubricating oil, for example, grease or the like, to the balls 58 of the ball circulating grooves 80.

The lubricating oil supply portions 152 are constituted from first supply grooves 154 formed in the upper surface of the cylinder main body 12, and which extend in a direction perpendicular to the longitudinal direction (the directions of arrows A and B) of the cylinder main body 12, and second supply grooves 156, which communicate with the first supply grooves 154 and are formed in a lower surface of the guide block 76 of the guide mechanism 16.

The first supply grooves 154, for example, are disposed in plurality (e.g., four grooves) and are separated at predetermined intervals along the longitudinal direction (the directions of arrows A and B) of the cylinder main body 12. The first supply grooves 154 are formed, respectively, on opposite sides centrally about the recess 20 of the cylinder main body 12. Additionally, the first supply grooves 154 are recessed at a predetermined depth with respect to the upper surface of the cylinder main body 12, and extend from both side surfaces of the cylinder main body 12 to positions facing the ball circulation grooves 80 of the guide block 76.

The second supply grooves 156 are disposed in plurality similar to the first supply grooves 154, and extend perpendicularly to the longitudinal direction (the directions of arrows A and B) of the guide block 76, such that when the guide mechanism 16 is assembled on the cylinder main body 12, the second supply grooves 156 are formed along straight lines together with the first supply grooves 154. Further, the second supply grooves 156 extend from both side surfaces of the guide block 76 to the pair of ball circulation grooves 80, and ends of the second supply grooves 156 are formed in facing relation to the balls 58 that are installed in the ball circulation grooves 80.

By supply of lubricating oil from ends of the first supply grooves 154 under operation of a non-illustrated lubricating oil supply means (e.g., a grease injection tool), the lubricating oil is introduced and directed along the first supply grooves 154 to the side of the guide mechanism 16. Also, part of the oil is introduced from the first supply grooves 154 to the second supply grooves 156. Consequently, lubricating oil is supplied to the interior of the ball circulation grooves 80 and the plural balls 58 are lubricated.

More specifically, by supply of lubricating oil on a regular basis to the lubricating oil supply portions 152, lubrication of the plural balls 58 can be carried out easily and reliably, and by ensuring that the balls 58 are circulated smoothly, the slide table 14 can be displaced in a smooth manner, and durability of the balls 58 can be enhanced.

Further, when lubrication of the balls 58 is carried out, since such lubrication can be carried out easily through the lubricating oil supply portions 152 without requiring disassembly of the linear actuator 150, ease of maintenance on the linear actuator 150 can be enhanced.

Furthermore, in the guide block 76, since the ball circulation grooves 80 in which the balls 58 are installed are disposed so as to open on the lower surface side facing the cylinder main body 12, by disposing the first supply grooves 154 on the upper surface side of the cylinder main body 12, lubricating oil can be supplied easily to the ball circulation grooves 80.

Further still, the guide mechanism 16 having the aforementioned structure is not limited to a case in which a fluid pressure cylinder is used that drives the slide table 14 through the cylinder mechanisms 42 and the guide mechanism 16, the cylinder mechanisms 42 being displaced by a pressure fluid supplied to the cylinder main body 12, as in the linear actuators 10, 150 according to the first and second embodiments. For example, the principles of the present invention may be applied to an electric actuator comprising the above-described guide mechanism 16, and in which the slide table 14 is displaced along the cylinder main body 12 by a drive source such as a motor or the like.

Next, a linear actuator 200 according to a third embodiment is shown in FIGS. 13 through 19. Constituent elements thereof, which are the same as those found in the linear actuator 10 according to the aforementioned first embodiment, are denoted by the same reference characters, and detailed description of such features is omitted.

The linear actuator 200 differs from the linear actuator 10 according to the first embodiment, in that a guide mechanism 206 is used in which the cover plates 86a, 86b are dispensed with, and which is equipped with ball clips 202a, 202b having a pair of straight portions 204a, 204b capable of retaining the balls 58.

As shown in FIGS. 13 through 16, the guide mechanism 206 includes a wide flat guide block 76, a pair of cover blocks 208a, 208b disposed on opposite ends of the guide block 76, plural balls 58 that circulate in the longitudinal direction of the guide block 76, the pair of ball clips 202a, 202b that retain the balls 58 in the ball circulation grooves 80 of the guide block 76, and a pair of cover clips 84a, 84b that serve to retain the cover blocks 208a, 208b with respect to the guide block 76.

Figure 17:
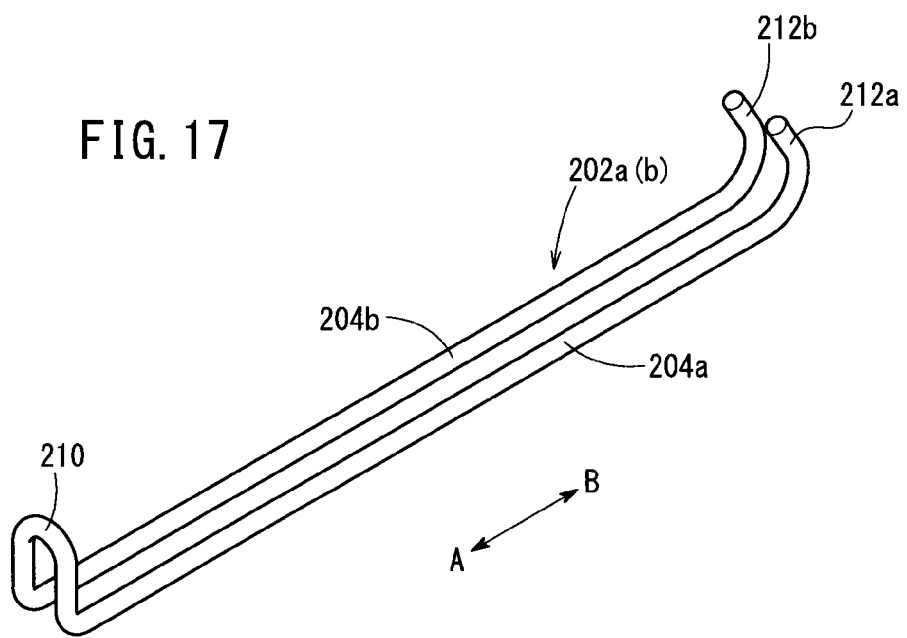
FIG. 17 is an exterior perspective view of a ball clip that is used in the guide mechanism of FIG. 14.

As shown in FIG. 17, the ball clips 202a, 202b each include the pair of straight portions 204a, 204b constituted from a wire material, for example, made from a metal material such as stainless steel or the like, and which are formed along straight lines substantially in parallel with each other, a connecting portion 210 that connects ends of the straight portions 204a, 204b, and curved portions 212a, 212b, which are formed on other ends of the straight portions 204a, 204b.

The straight portions 204a, 204b, for example, are separated at an interval which is substantially the same as the widthwise dimension of the ball circulation grooves 80, and are formed with a length in the longitudinal direction (the directions of arrows A and B), which is the same or slightly smaller than the length in the longitudinal direction (the directions of arrows A and B) of the pair of cover blocks 208a, 208b and the guide block 76.

The connecting portion 210 is formed with a U-shape in cross section so as to connect an end on one of the straight portions 204a and an end on the other of the straight portions 204b, and the connecting portion 210 is formed perpendicularly to the longitudinal direction of the straight portions 204a, 204b.

The curved portions 212a, 212b are formed in a curved fashion with respect to the other ends of the straight portions 204a, 204b so as to bend toward the one end side (in the direction of the arrow A). One of the curved portions 212a and the other of the curved portions 212b are formed mutually in parallel. The ball clips 202a, 202b may be formed, for example, by bending a single wire material by way of press forming or the like.

The cover blocks 208a, 208b are disposed respectively on one end side and the other end side of the guide block 76. On the main body portions of the cover blocks 208a, 208b, respective first clip grooves 214 are formed at positions along a straight line with the ball circulating grooves 80 of the guide block 76. Together therewith, at positions on the side of the arcuate section 96 with respect to the first clip grooves 214, a pair of second clip grooves 216 are formed for engagement with the cover clips 84a, 84b.

Figure 18:
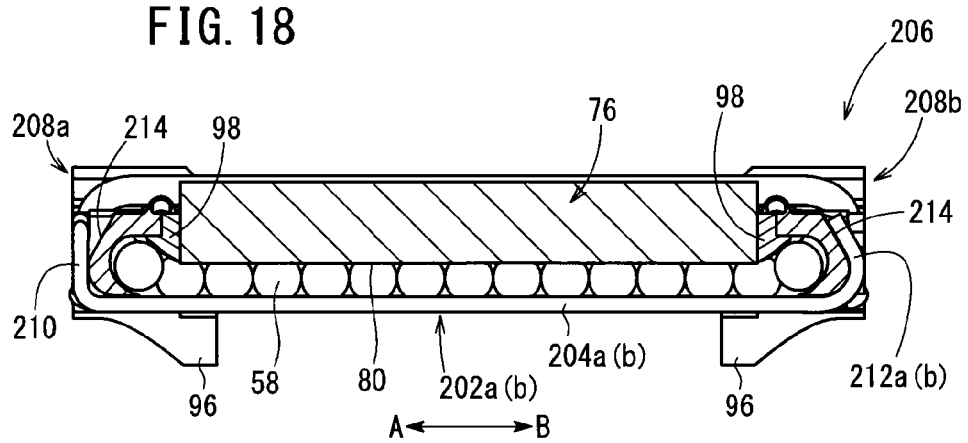
FIG. 18 is a cross sectional view taken along line XVIII-XVIII of FIG. 14.

The first clip grooves 214 are recessed toward the side of the guide block 76 with respect to the end surfaces of the cover blocks 208a, 208b, with upper portions thereof being inclined toward the side of the guide block 76. More specifically, as shown in FIG. 18, from a lower end to an upper end thereof, the first clip grooves 214 are inclined at a predetermined angle toward the side of the guide block 76.

The first clip grooves 214 are separated by a predetermined distance and extend upwardly, and between the first clip grooves 214, projections 218 are provided with which the connecting portions 210 of the ball clips 202a, 202b are engaged. Upper ends of the projections 218 are formed in a semicircular shape, for example, and project outwardly at a predetermined height with respect to the first clip grooves 214 toward end surface sides of the cover blocks 208a, 208b.

The second clip grooves 216 are formed, respectively, to incline upwardly in directions away from the first clip grooves 214. The second bent portions 120a, 120b of the cover clips 84a, 84b are inserted and engaged, respectively, in the second clip grooves 216.

Figure 19:
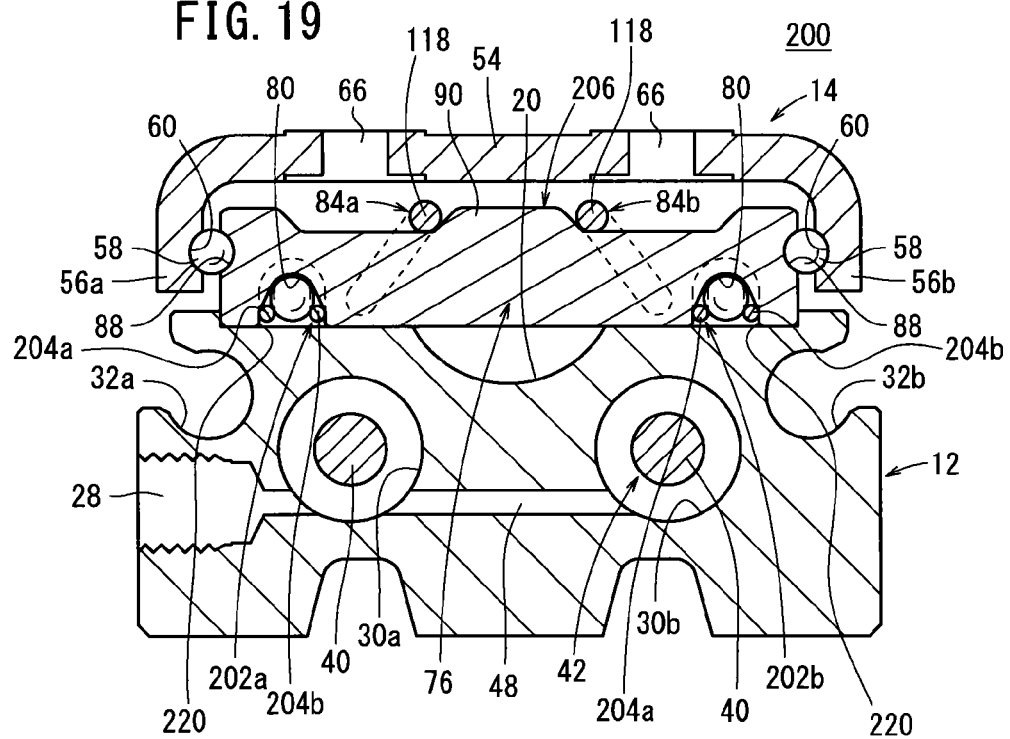
FIG. 19 is a cross sectional view showing a direction perpendicular to the longitudinal direction of the linear actuator of FIG. 13.

Additionally, when the ball clips 202a, 202b, and the cover clips 84a, 84b are mounted on the guide mechanism 206, initially, in a state in which the guide block 76 is placed with the ball circulation grooves 80 oriented upwardly, and the plural balls 58 are installed in the ball circulation grooves 80, the straight portions 204a, 204b of the ball clips 202a, 202b are placed in openings 220 of the ball circulation grooves 80 in abutment against outer circumferential surfaces of the balls 58 (see FIG. 19).

Next, the cover blocks 208a, 208b are disposed respectively on both end surfaces of the guide block 76, and the second bent portions 120a, 120b of the cover clips 84a, 84b are engaged respectively in the second clip grooves 216, whereby the pair of cover blocks 208a, 208b is retained on both ends of the guide block 76. Simultaneously, the connecting portions 210 of the ball clips 202a, 202b are made to engage with the projections 218 on one of the cover blocks 208a, and the curved portions 212a, 212b are made to engage with the first clip grooves 214 on the other of the cover blocks 208b.

Consequently, the pair of ball clips 202a, 202b is retained on the pair of cover blocks 208a, 208b via the connecting portions 210 and the curved portions 212a, 212b, and the plural balls 58 are kept in a retained state in the ball circulation grooves 80 by the straight portions 204a, 204b. That is, an assembled condition is brought about, in which the pair of ball clips 202a, 202b and the cover clips 84a, 84b are attached with respect to the guide mechanism 206.

In the foregoing manner, with the linear actuator 200 according to the third embodiment, since the cover plates 86a, 86b, which are used in the linear actuator 10 according to the aforementioned first embodiment, are unnecessary, the number of parts can be reduced and the linear actuator 200 can be made smaller in scale. Together therewith, by reducing the number of assembly steps, ease of manufacturing is enhanced and manufacturing costs can be reduced.

Further, since the balls 58, which are installed in the ball circulation grooves 80 of the guide block 76, are retained in a movable state along the direction of travel of the balls by the pair of straight portions 204a, 204b, the balls 58 can be retained securely and can reliably be prevented from dropping out from the ball circulation grooves 80. Furthermore, due to retention of the balls 58 by the pair of straight portions 204a, 204b, for example, compared to a situation in which the balls 58 are retained with respect to the ball circulation grooves 80 by a single straight portion, since sliding resistance of the balls 58 can be decreased, upon movement of the slide table 14, the balls 58 can be made to roll more smoothly along the ball circulation grooves 80.

Furthermore, since the balls 58 are retained reliably in the ball circulation grooves 80 by the ball clips 202a, 202b, the openings 220 of the ball circulation grooves 80 can be formed with a large size, and ease of manufacturing can be enhanced, for example, in the case that the guide block 76 equipped with the ball circulation grooves 80 is formed by a drawing process or by forging or the like.

Figure 20:
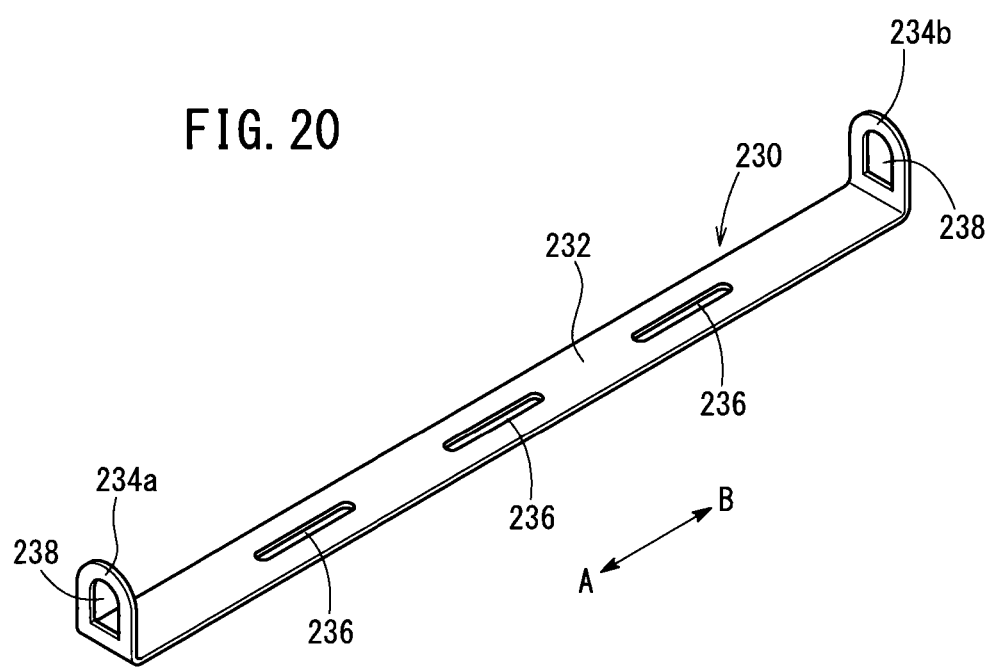
FIG. 20 is an exterior perspective view showing a ball clip according to a modification.

Further, the aforementioned ball clips 202a, 202b are not limited to the case of being formed from a wire material as shown in FIG. 17. According to a modification, as shown in FIG. 20, a ball clip 230 may be formed by press forming a plate-like member, which is made from a metal material or a resin material, for example.

The ball clip 230 comprises a ball retaining portion 232 having a predetermined width and which extends in the longitudinal direction for retaining the balls 58, and a pair of respective bent portions 234a, 234b, which are bent at substantially right angles on opposite ends of the ball retaining portion 232. The ball retaining portion 232 is formed, for example, with a flat shape, and filling grooves 236, which are filled with lubricating oil such as grease or the like, are formed in a central part of the ball retaining portion 232. The filling grooves 236 are disposed in plurality separated mutually in the longitudinal direction of the ball retaining portion 232, and are recessed a predetermined depth with respect to the surface of the ball retaining portion 232.

Upper ends of the respective bent portions 234a, 234b are formed with semicircular shapes in cross section, and in the centers thereof, frame-like shapes are provided in which engagement holes 238 are formed. The bent portions 234a, 234b are formed with substantially the same widthwise dimension as the ball retaining portion 232.

In addition, when the aforementioned ball clips 230 are installed on the guide block 76 and the cover blocks 208a, 208b, in a state in which the balls 58 are installed in the ball circulation grooves 80 of the guide block 76, after the surfaces of the ball retaining portions 232, i.e., the surfaces on the side of the filling grooves 236, have been arranged to face toward the balls 58, the bent portions 234a, 234b are inserted respectively into the first clip grooves 214 of the cover blocks 208a, 208b, and the engagement holes 238 are engaged with the projections 218.

As a result, a condition is brought about in which the ball clips 230 are retained on the pair of cover blocks 208a, 208b through the pair of bent portions 234a, 234b, and the plural balls 58 are retained inside the ball circulation grooves 80 by the ball retaining portions 232. In addition, because the filling grooves 236, which are filled with lubricating oil, are arranged in positions facing toward the plural balls 58, when the balls 58 roll along the ball circulation grooves 80, the balls 58 can be lubricated suitably by the lubricating oil.

In this manner, as a result of forming the ball clips 230 by press forming a plate-like material, the production cost of the ball clips 230 can be reduced, and ease of manufacturing thereof can be enhanced. Further, by forming the ball retaining portions 232 as flat plates, the filling grooves 236, which are capable of being filled with lubricating oil, can be formed therein, and thus the ball retaining portions 232 can be equipped with a lubricating function for the balls 58.

The linear actuator according to the present invention is not limited to the embodiment described above, but various alternative or additional features and structures may be adopted without deviating from the essence and scope of the invention as set forth in the appended claims.

The invention claimed is:

1. A linear actuator in which a slide table is made to move reciprocally along an axial direction of a cylinder main body, comprising:
a guide mechanism comprising a guide block attached to the cylinder main body and in which circulation grooves are formed through which a plurality of rolling bodies roll and circulate, and a cover member disposed on an end of the guide block, the guide mechanism guiding the slide table along an axial direction of the cylinder main body; and
a retainer installed on the guide block, for retaining the rolling bodies freely circulatable in the circulation grooves, and for retaining the cover member with respect to the guide block,
wherein the circulation grooves are formed to open in the guide block along a longitudinal direction thereof, and the retainer is disposed detachably with respect to the guide block.

2. The linear actuator according to claim 1, wherein the retainer comprises a retaining member for retaining the rolling bodies, and the retaining member includes a rolling body retaining part that extends along the circulation grooves and retains the rolling bodies, and a cover retaining part, which is bent with respect to the rolling body retaining part and serves to retain the cover member.

3. The linear actuator according to claim 2, wherein the circulation grooves open toward a side of the cylinder main body.

4. The linear actuator according to claim 2, wherein the retainer comprises another retaining member, which together with the retaining member serves to retain the cover member on the end of the guide block.

5. The linear actuator according to claim 4, wherein the other retaining member comprises:
a straight portion that extends along the guide block; and
a pair of cover retaining portions, which are bent with respect to the straight portion and serve to retain the cover member.

6. The linear actuator according to claim 2, wherein the rolling body retaining parts are disposed as a pair and are separated mutually in parallel, are disposed in an opening of the circulation grooves, and are arranged along a direction of extension of the circulation grooves.

7. The linear actuator according to claim 2, wherein the retaining member is formed by bending a wire material.

8. The linear actuator according to claim 2, wherein the retaining member is formed by press forming a plate member.

9. The linear actuator according to claim 8, wherein the rolling body retaining part of the retaining member is formed in a planar shape, and a filling portion, which is filled with lubricating oil, is formed in the rolling body retaining part.

10. The linear actuator according to claim 9, wherein the filling portion is disposed at a position in the rolling body retaining part that faces toward the rolling bodies.

11. The linear actuator according to claim 1, wherein a lubricating oil supply portion for supplying a lubricating oil to the circulation grooves is disposed in the cylinder main body.

12. The linear actuator according to claim 11, wherein the lubricating oil supply portion comprises a supply groove that is exposed to exterior of the cylinder main body and extends to a location facing the circulation groove.

* * * * *